United States Patent
Melgar et al.

(10) Patent No.: US 10,523,039 B2
(45) Date of Patent: Dec. 31, 2019

(54) SYSTEMS FOR BATTERY CHARGING USING A WIRELESS CHARGING SIGNAL

(71) Applicant: Lion Semiconductor Inc., San Francisco, CA (US)

(72) Inventors: Aaron Melgar, San Martin, CA (US); Wonyoung Kim, Mountain View, CA (US); Hans Meyvaert, Oakland, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 119 days.

(21) Appl. No.: 15/674,870

(22) Filed: Aug. 11, 2017

(65) Prior Publication Data

US 2019/0052113 A1    Feb. 14, 2019

(51) Int. Cl.
*H02J 7/02* (2016.01)
*H02J 50/80* (2016.01)
*H02J 50/10* (2016.01)
*H04B 5/00* (2006.01)
*H02J 50/00* (2016.01)

(52) U.S. Cl.
CPC .............. *H02J 7/025* (2013.01); *H02J 50/00* (2016.02); *H02J 50/10* (2016.02); *H02J 50/80* (2016.02); *H04B 5/0037* (2013.01)

(58) Field of Classification Search
CPC ....................................................... H02J 7/025
USPC ....................................................... 320/108
See application file for complete search history.

(56) References Cited

U.S. PATENT DOCUMENTS

| | | | |
|---|---|---|---|
| 9,143,032 B2 | 9/2015 | Le et al. | |
| 2009/0108805 A1 | 4/2009 | Liu et al. | |
| 2013/0093389 A1* | 4/2013 | Partovi | H01F 7/0252 320/108 |
| 2013/0175983 A1 | 7/2013 | Partovi et al. | |
| 2014/0306654 A1* | 10/2014 | Partovi | H02J 7/025 320/108 |
| 2015/0091508 A1 | 4/2015 | Meunier et al. | |

OTHER PUBLICATIONS

International Search Report and Written Opinion dated Oct. 19, 2018 in International Patent Application No. PCT/US2018/046321.
U.S. Appl. No. 15/092,037, filed Apr. 6, 2016.
U.S. Appl. No. 62/324,091, filed Apr. 18, 2016.

* cited by examiner

*Primary Examiner* — Edward Tso
*Assistant Examiner* — Ahmed H Omar
(74) *Attorney, Agent, or Firm* — Byrne Poh LLP

(57) ABSTRACT

Systems for charging a battery are provided, the systems comprising: a regulator having an output coupled to the battery and having an input; a wireless charging receiver having an output coupled to the input of the regulator and having an input that receives a power signal from a wireless charging transmitter; a controller having a first input coupled to the input of the regulator, having a second input coupled to the output of the regulator, and having a first output coupled to the wireless charging transmitter, wherein the controller is configured to send, using the first output of the controller, a control signal to the wireless charging transmitter that causes the wireless charging transmitter to change the power signal provided to the wireless charging receiver.

18 Claims, 13 Drawing Sheets

SYSTEMS FOR BATTERY CHARGING USING A WIRELESS CHARGING SIGNAL

TECHNICAL FIELD

The present disclosure relates to apparatuses, systems, and methods for charging a battery.

BACKGROUND

There is a strong demand to reduce the size of electronic systems. Size reduction is especially desirable in mobile electronics in which space is a premium, but is also desirable in servers that are placed in big data centers since it is important to squeeze in as many servers as possible into fixed-size real estate.

Some of the largest components in electronic systems are voltage regulators (also referred to as power regulators). Voltage regulators often include a large number of bulky off-chip components to deliver voltages to integrated chips, including processors, memory devices (e.g., a dynamic random access memory (DRAM)), radio-frequency (RF) chips, WiFi combo chips, and power amplifiers. Therefore, it is desirable to reduce the size of voltage regulators in electronic systems.

Voltage regulators include semiconductor chips, such as DC-DC regulator chips, that each deliver power from a power source (e.g., a battery) to an output load. The output load can include a variety of integrated chips (e.g., an application processor, a DRAM, a NAND flash memory, etc.) in an electronic device.

To efficiently deliver power, a voltage regulator can use a "buck" topology. Such a regulator can be referred to as a buck regulator (also referred to as a buck converter). A buck regulator transfers charge from a power source to an output load using an inductor. A buck regulator can use power switches to rapidly connect/disconnect an inductor to/from multiple voltages (each at a different point in time), thereby providing an output voltage that is a weighted average of the multiple voltages. A buck regulator can adjust the output voltage by controlling the amount of time the inductor is connected to each of the multiple voltages.

Unfortunately, a buck regulator is not suitable for highly integrated electronic systems. The conversion efficiency of a buck regulator depends on the size of its inductor, in particular when the power conversion ratio is high and when the amount of current consumed by its output load is high. Because an inductor can occupy a large area and is bulky to integrate on-die or on-package, existing buck regulators often use a large number of off-chip inductor components. This strategy often requires a large area on a printed circuit board on which an existing buck regulator and its corresponding off-chip inductor components are located, which in turn increases the size of an electronic device in which the printed circuit board is located. The challenge is exacerbated as mobile system-on-chips (SoCs) become more complex and need increasingly larger number of voltage domains to be delivered by their voltage regulators.

Furthermore, a buck regulator is not well suited for high-speed charging of a battery. High-speed charging generally requires the use of a high input voltage. The use of a high input voltage, in turn, requires the buck regulator to provide a high voltage conversion ratio ($V_{IN}/V_{OUT}$) to convert a high input voltage ($V_{IN}$) to an output voltage ($V_{OUT}$) that is suitable for batteries. Unfortunately, at a high voltage conversion ratio, the efficiency of the buck regulator is relatively low when compared to other types of voltage regulators, at least in part because the buck regulator wastes a large amount of power through heat dissipation. The heat dissipated by a buck regulator may raise the operating temperature of devices within an electronic system, which could cause malfunctioning. Therefore, buck regulators are not well suited for high-speed charging of batteries.

Instead of a buck regulator, a high-speed charging system may use a switched-capacitor regulator to charge a battery. A switched capacitor regulator is known to be efficient even at a high voltage conversion ratio as long as the voltage conversion ratio is an integer number. Unfortunately, existing charging systems do not include a mechanism for keeping the conversion ratio of a switched capacitor regulator at an integer number, and hence, the high efficiency of a switched capacitor regulator cannot be maintained across operating conditions. Therefore, there is a strong need to provide a charging system that is capable of maintaining a high efficiency at high input to output conversion ratios.

SUMMARY

Systems for systems for battery charging using wireless charging signals are provided. In some embodiments, systems for charging a battery are provided, the systems comprising: a regulator having an output coupled to the battery and having an input; a wireless charging receiver having an output coupled to the input of the regulator and having an input that receives a power signal from a wireless charging transmitter; a controller having a first input coupled to the input of the regulator, having a second input coupled to the output of the regulator, and having a first output coupled to the wireless charging transmitter, wherein the controller is configured to send, using the first output of the controller, a control signal to the wireless charging transmitter that causes the wireless charging transmitter to change the power signal provided to the wireless charging receiver.

In some of these embodiments, the control signal causes the wireless charging transmitter to change at least one of an amplitude and a frequency of an AC voltage on an inductor of the wireless charging transmitter that is inductively coupled to an inductor of the wireless charging receiver.

In some of these embodiments, the control signal causes a voltage output by the output of the wireless charging receiver to change.

In some of these embodiments, the control signal causes the voltage output by the output of the wireless charging receiver to increase by a step amount.

In some of these embodiments, the control signal causes the voltage output by the output of the wireless charging receiver to decrease by a step amount.

In some of these embodiments, the regulator includes a switched capacitor regulator, and wherein the control signal causes the voltage output by the output of the wireless charging receiver to change to a voltage that is an integer multiple of a voltage output by the output of the regulator.

In some of these embodiments, the controller measures a first measured voltage at the first input and measures a second measured voltage at the second input.

In some of these embodiments, the controller measures a first measured voltage at the first input and measures a second measured voltage at the second input, and sends the control signal based upon a ratio of the first measured voltage to the second measured voltage.

In some of these embodiments, the controller measures a first measured voltage at the first input and measures a second measured voltage at the second input, and sends the control signal based upon a ratio of the first measured voltage to the second measured voltage being greater than a value.

In some of these embodiments, the value is a threshold about more than a conversion factor of the regulator.

In some of these embodiments, the controller has a second output coupled to the regulator that causes the regulator to switch modes.

In some of these embodiments, the controller has a second output coupled to the regulator that causes the regulator to switch modes and the controller causes the regulator to change from a first conversion mode of the regulator to a second conversion mode of the regulator.

In some of these embodiments, the controller has a second output coupled to the regulator that causes the regulator to switch modes and the controller causes the regulator to change from a first conversion mode of the regulator to a second conversion mode of the regulator, wherein the first conversion mode of the regulator has a different conversion factor that the second conversion mode of the regulator.

In some of these embodiments, the first output of the controller is wirelessly coupled to the wireless charging transmitter.

In some of these embodiments, the first output of the controller is wirelessly coupled to the wireless charging transmitter using the wireless charging receiver.

In some of these embodiments, the input of the regulator is also coupled to an adapter port configured to be coupled to a wired charging adapter.

In some of these embodiments, the input of the regulator is also coupled to an adapter port configured to be coupled to a wired charging adapter, the controller determines whether a wired charging adapter is coupled to the adapter port, and when the controller determines that a wired charging adapter is coupled to the adapter port, the controller controls an output voltage provided by the adapter.

In some of these embodiments, the input of the regulator is also coupled to an adapter port configured to be coupled to a wired charging adapter and the controller controls the output voltage provided by the adapter to be an integer multiple of a voltage provided at the output of the regulator.

In some of these embodiments, the input of the regulator is also coupled to an adapter port configured to be coupled to a wired charging adapter and the input of the regulator is coupled to the wireless charging receiver by a switch.

In some of these embodiments, the input of the regulator is also coupled to an adapter port configured to be coupled to a wired charging adapter and the input of the regulator is coupled to the adapter port by a switch.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding examples of apparatuses, systems, and methods that can be implemented in accordance with the disclosed subject matter and the environment in which such apparatuses, systems, and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid over complicating the disclosed subject matter. In addition, it will be understood that the examples provided below are for illustration purposes, and that it is contemplated that there are other apparatuses, systems, and methods that are within the scope of the disclosed subject matter that differ from the examples provided.

Figure 1:
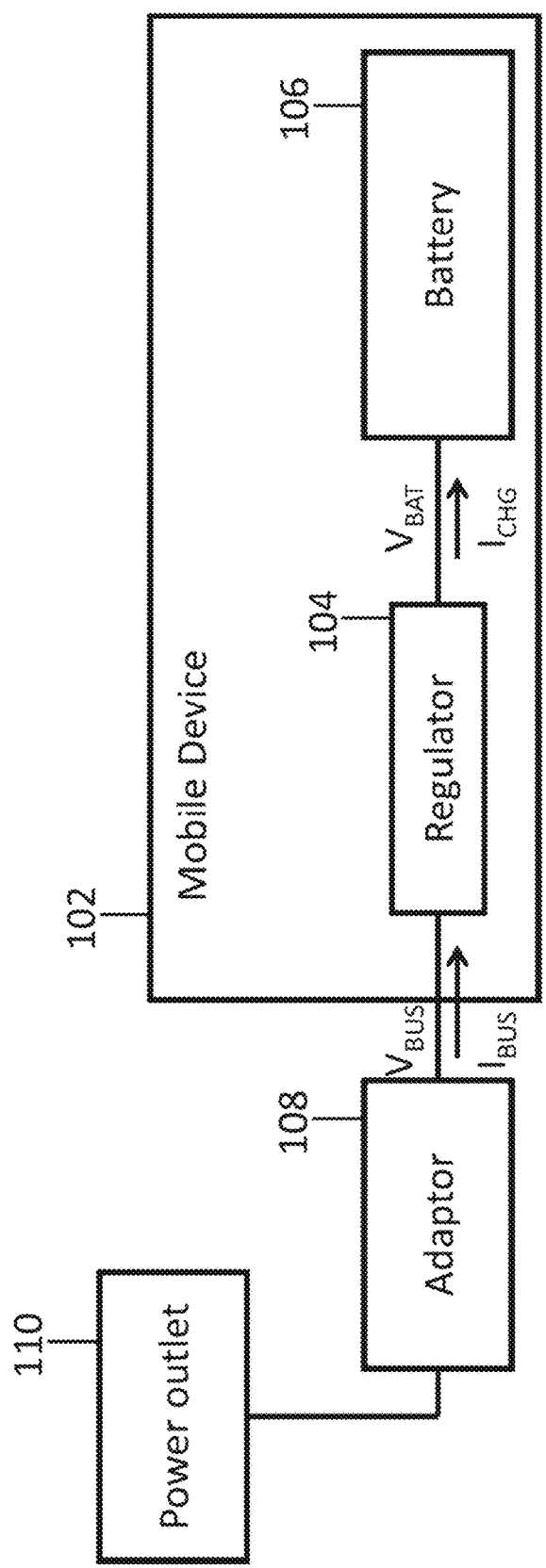
FIG. 1 depicts an example of a block diagram of a typical charging system for a mobile device as known in the prior art.

Fast battery charging is an important feature of mobile devices. FIG. 1 depicts an example of a typical charging system of a mobile device. The charging system includes a mobile device 102, which includes, among other things, a regulator 104 and a battery 106. Regulator 104 is configured to provide power to battery 106 so that the battery is charged using the power provided by regulator 104.

Regulator 104 in mobile device 102 is configured to couple to an adapter 108. Adapter 108 is configured to receive a high AC input voltage (e.g., 110~220V) $V_{OUT\_WALL}$ from a power outlet 110 and convert $V_{OUT\_WALL}$ to a lower DC voltage $V_{BUS}$. Adapter 108 then provides the DC voltage $V_{BUS}$ to voltage regulator 104 through an interface, such as a USB port. Adapter 108 typically includes an AC/DC converter followed by a DC/DC converter.

Regulator 104 is configured to receive $V_{BUS}$ from adapter 108 and provide an output voltage $V_{BAT}$. The output voltage $V_{BAT}$ (and the corresponding current $I_{CHG}$) is then routed to battery 106 to charge the battery. Regulator 104 typically includes a DC/DC converter, and more specifically, a switching-inductor voltage regulator, such as a buck regulator.

In order to increase the charging speed of the battery, regulator 104 needs to deliver a higher amount of power to battery 106. Since the amount of power delivered by regulator 104 is computed as the multiplication of the output voltage $V_{BAT}$ and the corresponding current $I_{CHG}$, regulator 104 should increase either the output current $I_{CHG}$ or the output voltage $V_{BAT}$ in order to increase the charging speed.

Typically, regulator 104 cannot control the output voltage $V_{BAT}$. The output voltage $V_{BAT}$ is typically determined by the battery, and in particular, the battery chemistry (e.g., Li-Ion), number of battery cells stacked, and the amount of charge that had been accumulated in the battery, also referred to as a charge state. For example, the output voltage $V_{BAT}$, which is equivalent to the voltage across the battery, is increased as the battery becomes more charged. A single stack Li-Ion battery typically has a battery voltage $V_{BAT}$ of 3–4.5V. Typically, the battery voltage is 3V when the battery is completely discharged, and the battery voltage is 4.5V when the battery is completely charged. The battery voltage can gradually increase from 3V to 4.5V as the battery is charged from 0% to 100%. Therefore, regulator 104 cannot control the output voltage $V_{BAT}$. Hence, in order to increase the power delivered to battery 106, regulator 104 generally has to increase the output current $I_{CHG}$.

In order for regulator 104 to deliver an increased amount of power (e.g., an increased amount of current $I_{CHG}$) to battery 106, regulator 104 should receive an increased amount of power from adapter 108. This means that, in order to deliver an increased amount of power to battery 106, adapter 108 should also increase the output current $I_{BUS}$ and/or the output voltage $V_{BUS}$ provided to regulator 104.

It is often challenging for adapter 108 to increase the amount of output current $I_{BUS}$ because interface protocols for connecting adapter 108 to regulator 104 typically limit the amount of current that can flow through the interface compliant with the interface protocols. For example, USB standards limit the amount of current flowing through a USB Type C interface to 3 A. Moreover, for the adapter cable to withstand a large amount of current, the adapter cable should be made thicker, which, in turn, increases the cost of manufacturing the adapter cable. In fact, adapter cables actually became more expensive as the adapter cables were designed to accommodate higher current.

Instead of increasing the output current $I_{BUS}$, adapter 108 could increase the output voltage $V_{BUS}$ to deliver an increased amount of power. However, such a strategy is not ideal when regulator 104 uses a buck regulator. If the output voltage $V_{BUS}$ is increased, regulator 104 needs to operate at a higher voltage conversion ratio to convert a large $V_{BUS}$ to $V_{BAT}$. Unfortunately, operating regulator 104 at a high voltage conversion ratio is problematic when regulator 104 uses a buck regulator because the efficiency of a buck regulator degrades as the conversion ratio (e.g., $V_{BUS}/V_{BAT}$) increases.

The reduced efficiency of a regulator such as regulator 104 is highly problematic because it increases power dissipation. For example, the efficiency of a regulator can be written as follows:

$$\text{Efficiency} = P_{OUT}/P_{IN} = (P_{IN} - P_{DISS})/P_{IN}$$

where $P_{IN}$ is the input power, $P_{OUT}$ is the output power, and $P_{DISS}$ is the power dissipated by the regulator. Based on this relationship, the amount of power dissipated by the regulator can be derived as follows:

$$P_{IN} * \text{Efficiency} = P_{IN} - P_{DISS}$$

$$P_{DISS} = P_{IN} * (1 - \text{Efficiency})$$

When $V_{BUS}$ (the input voltage to the regulator) increases, the following two factors cause $P_{DISS}$ to increase as well: (1) $P_{IN}$ increases with a higher input voltage, which is $V_{BUS}$; and (2) the efficiency decreases with a higher conversion ratio.

The increased power dissipation ($P_{DISS}$) is a big problem for mobile devices because increased power dissipation leads to increased heat dissipation. There are strong restrictions on how hot a surface of a mobile device can be to protect users. Because mobile devices generally do not include a cooling mechanism, the heat dissipation budget is very tight. As a result, when a regulator dissipates too much heat, the regulator is typically designed to throttle the battery charging speed in order to reduce heat dissipation. This is undesirable for user experience.

Therefore, in order to maintain high speed charging under a tight heat dissipation budget, there is a strong need to provide a charging system that is capable of maintaining a high efficiency at high input-to-output conversion ratios.

Some embodiments of the disclosed subject matter include a voltage regulator system embedded in a mobile device to accommodate high speed charging of the mobile device. The voltage regulator system is capable of regulating the operation of a voltage regulator to maintain a high efficiency at high input-to-output conversion ratios.

Figure 10:
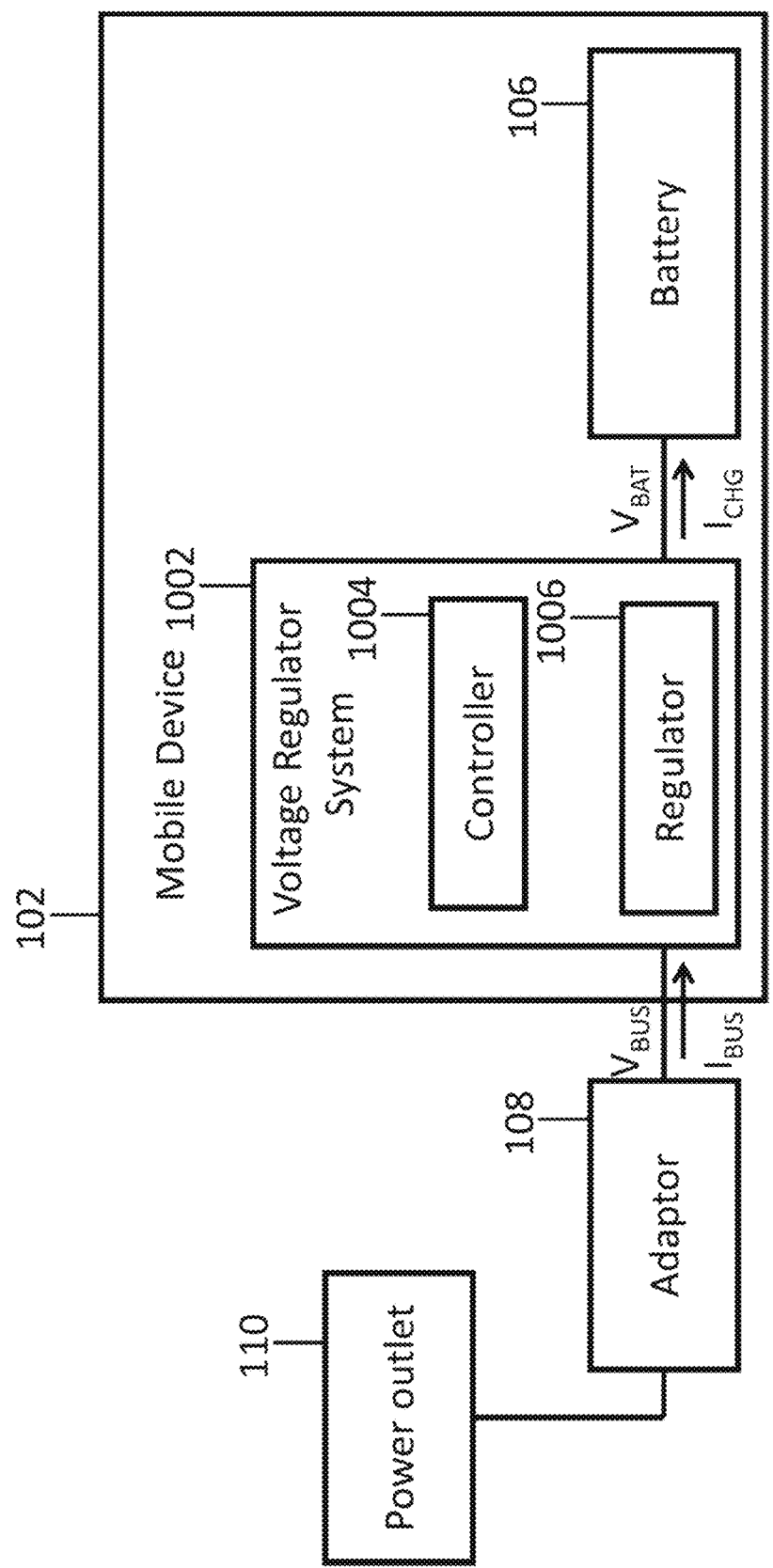
FIG. 10 shows an example of a block diagram of a charging system of a mobile device in accordance with some embodiments.

FIG. 10 shows a charging system of a mobile device in accordance with some embodiments. The charging system includes a mobile device 102 that has a battery 106, an adapter 108, and a power outlet 110, similarly to the charging system disclosed in FIG. 1. However, the charging system also includes a voltage regulator system 1002, which in turn includes a controller 1004 and a regulator 1006. Regulator 1006 includes an input terminal and an output terminal. The input terminal of the regulator is coupled to adaptor 108 to receive an input voltage, and the output terminal of the regulator is coupled to battery 104 to provide an output voltage to battery 104 for charging. Controller 1004 is configured to regulate the operation of regulator 1006 to maintain a high efficiency at high input-to-output conversion ratios.

In some embodiments, regulator 1006 includes a switched-capacitor (SC) regulator (also referred to as an SC converter). An SC regulator can use one or more capacitors to transfer charge from an input terminal (e.g., which is connected to a power source) to an output terminal (e.g., which is connected to an output load). An SC regulator can use power switches to rapidly connect/disconnect one or more capacitors to/from multiple voltage levels (each at a different point in time), thereby providing an output voltage that is a weighted average of the multiple voltage levels. The SC regulator can control the output voltage by changing the configuration, the sequence, and the duty cycle in which capacitors are coupled to one another.

Hereinafter, the term conversion ratio refers to the actual voltage ratio between the input voltage and the output voltage of a regulator, and the term conversion mode refers to a voltage ratio (e.g., a conversion factor) between the input voltage and the output voltage at which an ideal regulator (without non-idealities) achieves the highest efficiency. For example, an ideal SC regulator operating at a conversion mode of 2:1 achieves the highest efficiency when the conversion ratio of the SC regulator is 2, but the SC regulator operating at a conversion mode of 2:1 can still operate at a conversion ratio of 2.5, albeit at a lower efficiency. In an ideal SC regulator, the conversion ratio can be equal to the conversion factor of the conversion mode, but in a non-ideal SC regulator, the conversion ratio is generally larger than the conversion factor of the conversion mode.

While buck regulators have poor efficiencies at high conversion ratios, SC regulators tend to have a high efficiency even when the conversion ratio is high. In particular, SC regulators tend to have a high efficiency when the conversion ratio is close to an integer number, regardless of the actual value of the conversion ratio. Unfortunately, the efficiency of an SC regulator degrades as the conversion ratio deviates from an integer number. For example, an SC regulator can achieve high efficiencies when the input voltage is N times the output voltage of the SC regulator. However, the same SC regulator may not provide high efficiencies when the output voltage deviates from N.

In some embodiments, in order to maintain a high efficiency of the SC regulator in regulator 1006, controller 1004 can be configured to maintain a conversion ratio of the SC regulator close to an integer number. When the input-to-output voltage conversion ratio of the SC regulator deviates from an integer value—in part due to the increase of the battery voltage as the battery is charged—controller 1004 can request that the adapter increase the input voltage to the SC regulator so that the input-to-output voltage conversion ratio remains close to an integer value.

For example, suppose the SC regulator in regulator 1006 is operating at a conversion mode having a conversion factor of 2, and the output voltage of regulator 1006 (e.g., $V_{BAT}$) keeps rising as the battery is charged (e.g., from 3V to 4.5V in single stack Li-Ion batteries). In that case, controller 1004 can send an instruction (e.g., a signal) to adapter 108, requesting that the adapter increase its output voltage (e.g., $V_{BUS}$) so that the output voltage is close to $2 \times V_{BAT}$. That way, the conversion ratio of SC regulator 1006 can be maintained close to the conversion factor of the conversion mode.

Because the battery voltage ($V_{BAT}$) changes quite slowly and predictably (e.g., determined by the battery chemistry, number of battery cells stacked, and the charge state of the battery), it is possible for adapter 108 to reliably provide its output voltage (e.g., $V_{BUS}$) that is N times greater than the battery voltage ($V_{BAT}$).

Figure 2:
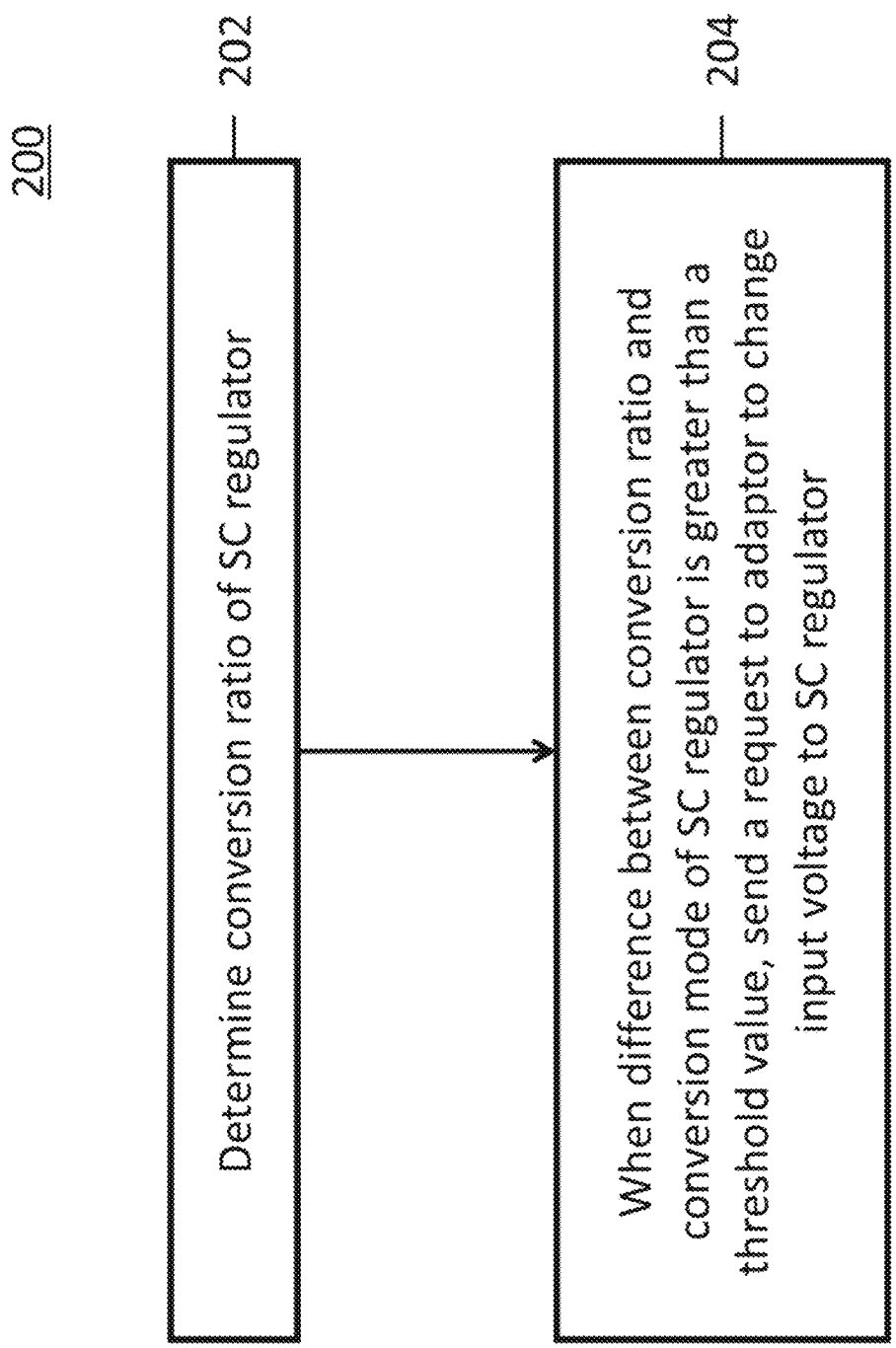
FIG. 2 illustrates an example of a flow diagram showing an example of a process that can be used to operate a voltage regulator system in accordance with some embodiments.

FIG. 2 illustrates an example of a flow diagram showing an example 200 of a process that can be used to operate a voltage regulator system, such as voltage regulator system 1002 shown in FIG. 10, in accordance with some embodiments. In block 202, a controller is configured to determine a conversion ratio of a SC regulator in the voltage regulator system. In block 204, the controller is configured to determine a difference between the conversion ratio of the SC regulator and the conversion factor of the conversion mode of the SC regulator. If that difference is greater than a predetermined threshold value, the controller is configured to send a request to an adapter to change the input voltage to the SC regulator so that the conversion ratio becomes closer to the conversion factor of the conversion mode. For example, when the conversion ratio is greater than the conversion factor of the conversion mode by more than the predetermined threshold, the controller can request that the adapter decrease the input voltage to the SC regulator; when the conversion ratio is greater than the conversion factor of the conversion mode by less than the predetermined threshold, the controller can request that the adapter increase the input voltage to the SC regulator. In some embodiments, the predetermined threshold can be zero.

In some embodiments, in block 204, the controller is configured to send a request to the adapter to increase the input voltage ($V_{BUS}$) to the SC regulator when the conversion ratio is less than the conversion factor of the conversion mode. In some cases, the controller is configured to send the request to the adapter until the conversion ratio becomes greater than the conversion mode. This way, the conversion ratio can be regulated to be greater than the conversion factor of the conversion mode during the operation of the regulator.

In some embodiments, the controller is configured to send the request to the adapter via a data signal line coupled to the adapter. For example, the controller can be configured to use the D+ and D− pins on most adapters to send the request. In other embodiments, the controller is configured to send the request to the adapter by modulating the output voltage provided by the adapter ($V_{BUS}$). In other embodiments, when the adapter is a USB Type C adapter, the controller is configured to send the request to the adapter using CC1 and CC2 pins. In some embodiments, the controller sends the request to the adapter in compliance with one or more wire communication protocols. Such wire communication protocols can include, for example, Qualcomm QuickCharge 2.0, Qualcomm QuickCharge 3.0, Samsung Adaptive Fast Charging, MediaTek Pump Express 2.0, MediaTek Pump Express 3.0, USB Power Delivery 2.0, USB Power Delivery 3.0, or any other suitable wire communication protocols or combination of protocols.

In some embodiments, the process of FIG. 2 can be implemented in voltage regulator 1004 using controller 1006 and adapter 108, all illustrated in FIG. 10.

Figure 3:
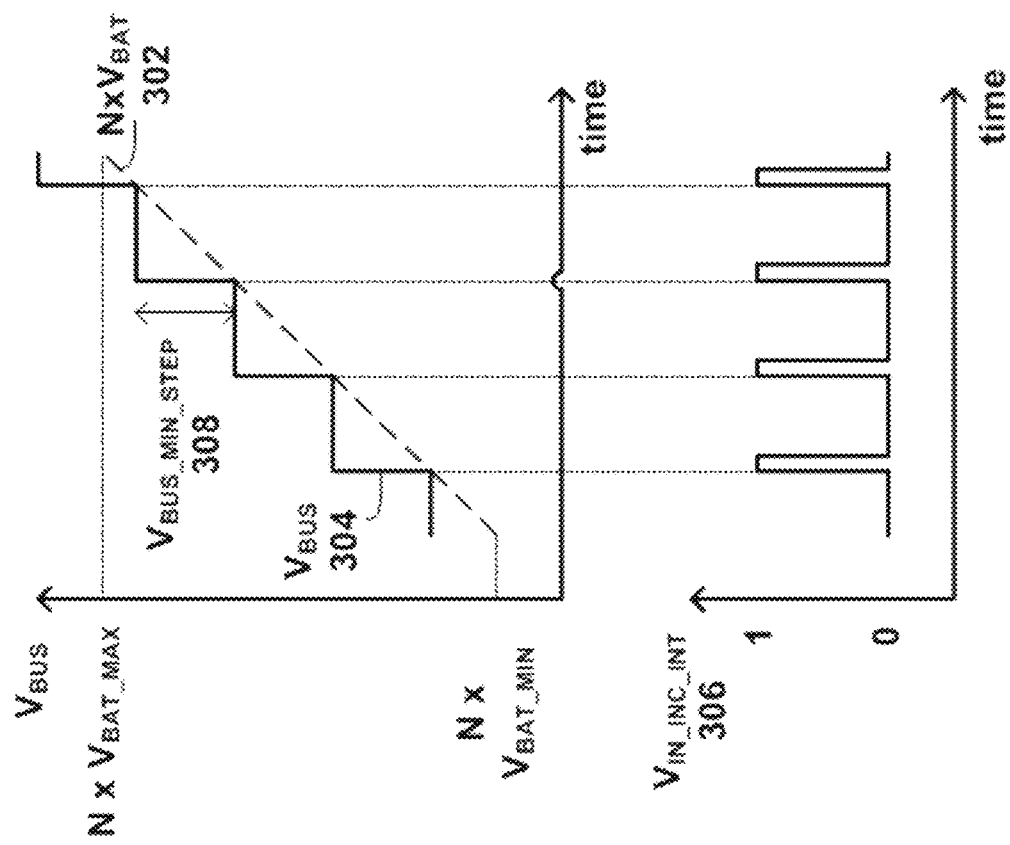
FIGS. 3A-3B illustrate examples of graphs showing the operation of a voltage regulator system in accordance with some embodiments.

FIGS. 3A-3B illustrate examples of graphs showing the operation of a voltage regulator system such as that shown in FIG. 10 in accordance with some embodiments. FIG. 3A shows an input voltage of an SC regulator as a battery is charged; FIG. 3B shows an interrupt signal indicating a time instance at which to increase the input voltage of the SC regulator. The vertical axis of the graphs show voltage levels, and the horizontal axis of the graphs shows time. These graphs illustrate the operation of an embodiment of a voltage regulator system in which (1) the SC regulator is operating at a conversion mode of N:1 (the conversion factor of N:1), and (2) the controller is configured to request that an adapter change the input voltage to the SC regulator when the conversion ratio of the SC regulator is less than the conversion mode of the SC regulator (e.g., when $V_{BUS}$ is less than $N \times V_{BAT}$). When the battery is discharged, the battery voltage $V_{BAT}$ is equal to $V_{BAT\_MIN}$. As the battery gets charged by the voltage regulator system, the battery voltage $V_{BAT}$ increases to $V_{BAT\_MAX}$, shown as a dotted line $N \times V_{BAT}$ 302 in FIG. 3A.

As the battery gets charged and the battery voltage $V_{BAT}$ increases from $V_{BAT\_MIN}$ to $V_{BAT\_MAX}$, the battery voltage $V_{BAT}$ may become sufficiently large such that $N \times V_{BAT}$ 302 becomes greater than the input voltage $V_{BUS}$. This indicates that the conversion ratio is less than the conversion mode. In this case, the controller is configured to request the adaptor to increase $V_{BUS}$ 304 so that $V_{BUS}$ 304 remains higher than $N \times V_{BAT}$ 302. This request can be a single bit interrupt signal $V_{IN\_INC\_INT}$ as shown in FIG. 3B. The controller can trigger the single bit signal $V_{IN\_INC\_INT}$ 306 when $N \times V_{BAT}$ 302 becomes greater than the input voltage $V_{BUS}$ 304. The controller can repeat this process until the battery is charged up to a certain percentage or fully charged. In some embodiments, the adaptor can be configured to increase the input voltage $V_{BUS}$ 304 to the SC regulator in steps: a voltage step $V_{BUS\_MIN\_STEP}$ 308 at a time. In this case, the input voltage $V_{BUS}$ 304 provided to the SC regulator would look like a staircase, as shown in FIG. 3A. In some embodiments, $V_{BUS\_MIN\_STEP}$ 308 can be a voltage between 1 mV and 2V, or any other suitable voltage range.

In reality, an SC regulator typically cannot precisely convert N×$V_{BAT}$ to $V_{BAT}$ because of non-idealities such as, for example, voltage drops caused by a parasitic resistance. Instead, a typical SC regulator would convert an input voltage N×$V_{BAT}$ to an output voltage that is lower than $V_{BAT}$. The non-idealities can be modeled as a voltage margin.

Figure 4:
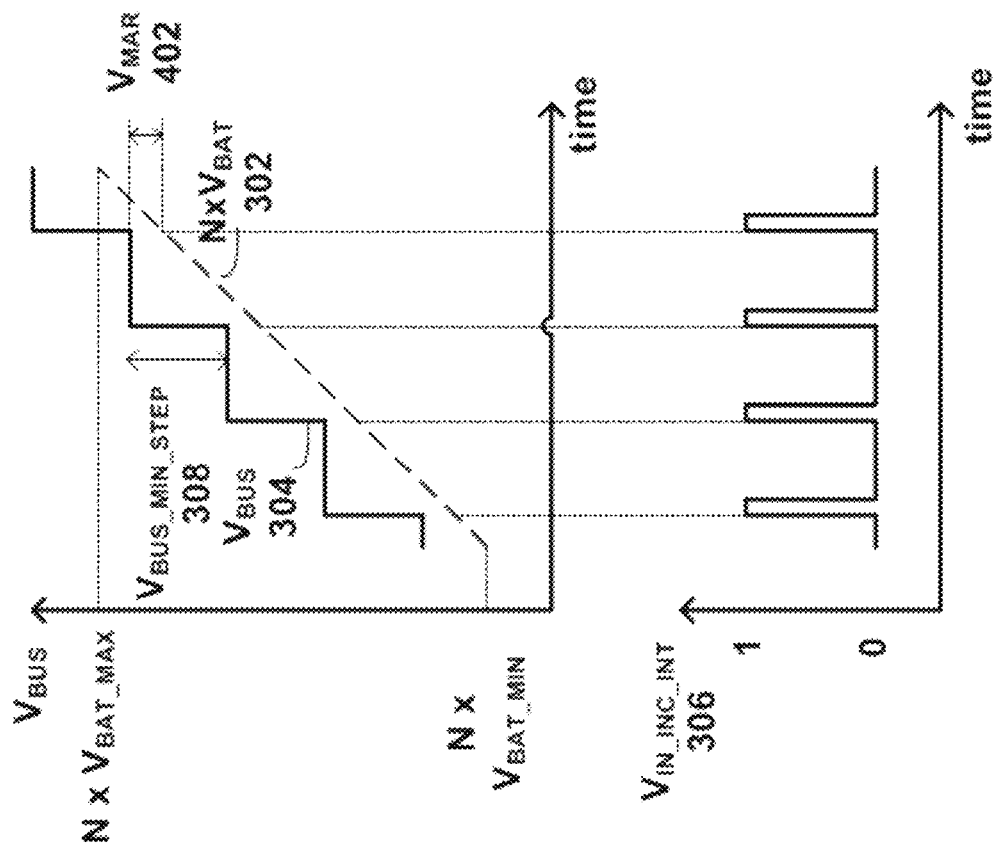
FIGS. 4A-4B illustrate examples of graphs showing the operation of a voltage regulator system with non-idealities in accordance with some embodiments.

FIGS. 4A-4B illustrate examples of graphs showing the operation of a voltage regulator system such as that shown in FIG. 10 with non-idealities in accordance with some embodiments. When the non-idealities are taken into account, the controller can effectively request the adapter to increase $V_{BUS}$ 304 when N×$V_{BAT}$ 302+$V_{MAR}$ 402 becomes greater than the input voltage $V_{BUS}$. In some embodiments, $V_{MAR}$ 402 can be a voltage between 1 mV and 2V, or any other suitable voltage range.

Figure 5:
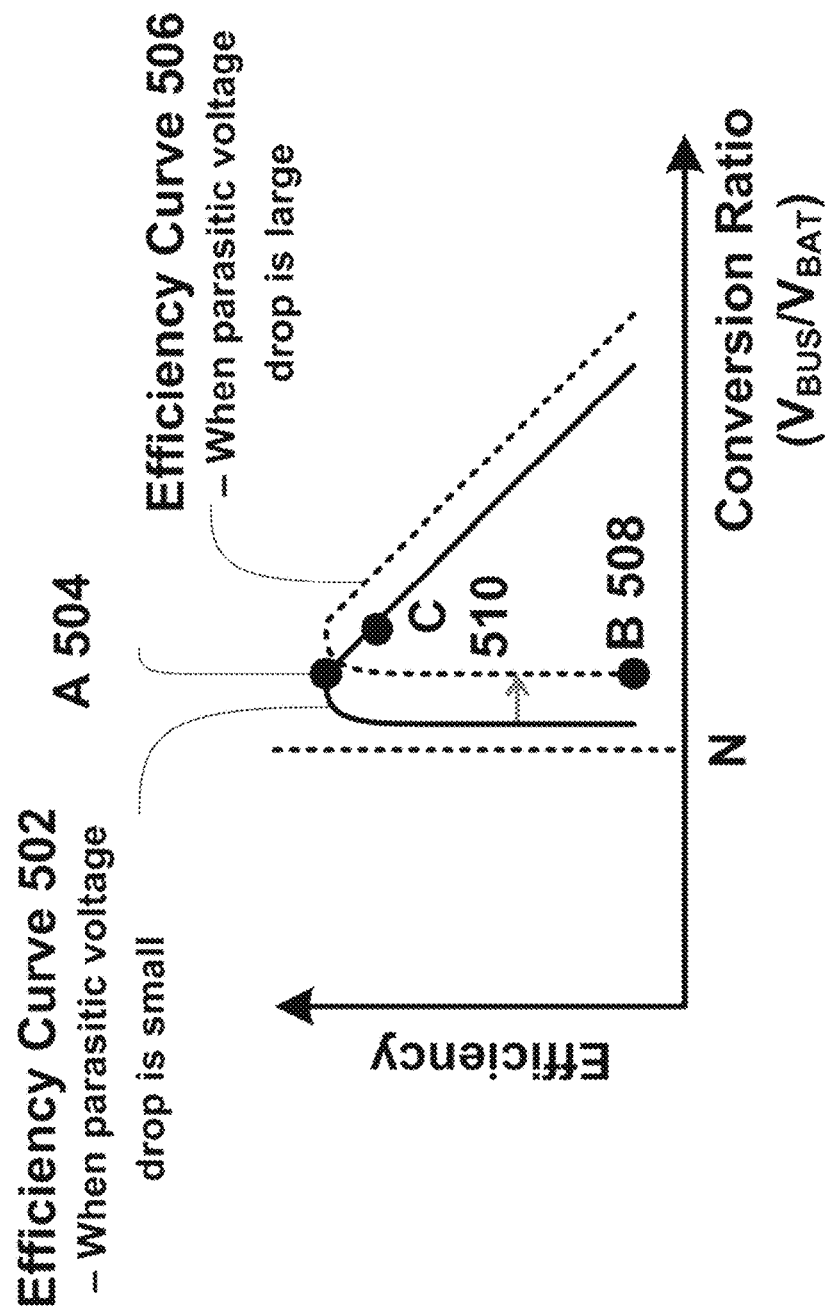
FIG. 5 illustrates an example of a graph showing the efficiency curves of a switched capacitor (SC) regulator with non-idealities in accordance with some embodiments.

FIG. 5 illustrates an example of a graph of the efficiency of an SC regulator with non-idealities in accordance with some embodiments. Starting from the right side of the plot, the efficiency of the SC regulator, shown by efficiency curve 502, increases as the conversion ratio ($V_{BUS}$/$V_{BAT}$) approaches the conversion mode N. The efficiency curve reaches a peak value (at operating point A 504) at some point, and starts to drop rapidly like a "cliff" as the conversion ratio gets closer to the conversion mode N. In other words, as $V_{SC\_DROP}$, which is equal to $V_{BUS}$/N-$V_{BAT}$, approaches 0, the efficiency 502 of the SC regulator drops rapidly. An N:1 SC regulator cannot regulate $V_{BAT}$ to $V_{BUS}$/N in non-ideal conditions because $V_{SC\_DROP}$ cannot be equal to 0.

As shown by efficiency curve 506, efficiency curve 502 shifts to the right as the parasitic voltage drop increases, which can be caused by higher output current. Even when $V_{BUS}$ and $V_{BAT}$ are fixed, efficiency curve 502 can shift to the right when output current changes. Because the efficiency curve depends on the output current, it is difficult to predetermine an operating point (e.g., the conversion ratio) of an SC regulator without sacrificing the efficiency of the SC regulator. For example, when the parasitic voltage drop is small, operating point A 504 on efficiency curve 502 is the most efficient operating point for an SC regulator. Therefore, the SC regulator can be operated at an operating point A 504 to maximize the SC regulator efficiency. However, if the parasitic voltage drop is large, efficiency curve 502 shifts to the right, and the same conversion ratio for that SC regulator now has a very low efficiency, as shown by operating point B 508. Such a low efficiency could cause heat problems due to excessive power dissipation and could cause the voltage regulator system to lose output regulation and therefore not be able to regulate the output voltage to a desired value.

In some embodiments, a voltage regulator system, such as voltage regulator system 1002 shown in FIG. 10, can be configured to operate an SC regulator at a sub-optimal operating point that is away from peak operating point 504. For example, such a voltage regulator system can be configured to operate an SC regulator at an operating point C 510 that has a conversion ratio sufficiently offset from the conversion ratio corresponding to peak operating point A 504. The offset between the conversion ratio of operating point C 510 and the conversion ratio of peak operating point A 504 provides a safety margin that protects the SC regulator from entering into a low efficiency mode.

In some embodiments, once a voltage regulator system, such as voltage regulator system 1002 shown in FIG. 10, determines the operating point for its SC regulator, the voltage regulator system can request that an adapter provide $V_{BUS}$ so that the conversion ratio of the SC regulator is matched to the conversion ratio associated with the determined operating point.

In some embodiments, a regulator used in such a voltage system can be a reconfigurable SC regulator that can be reconfigured to operate in one of a plurality of conversion modes, each associated with one of a plurality of integer conversion ratios. For example, a 3:1 reconfigurable SC regulator can support three conversion modes: 3:1, 2:1, and 1:1.

In some embodiments, a controller can be used to reconfigure the conversion mode of the reconfigurable SC regulator based on the conversion ratio of the reconfigurable SC regulator. For example, when the conversion ratio is close to 3:1, a controller can configure the reconfigurable SC regulator to operate in the 3:1 conversion mode. As the conversion ratio decreases (e.g., because the input voltage decreases or the output voltage increases), the controller can configure the reconfigurable SC regulator to operate in the 2:1 conversion mode. As the conversion ratio decreases further to a point where the conversion ratio is close to 1:1, the controller can configure the reconfigurable SC regulator to operate in the 1:1 conversion mode. This allows the voltage regulator system to accommodate a wide range of input voltages without a significant loss of efficiency.

In some embodiments, a regulator used in a voltage regulator system can include a reconfigurable SC regulator as disclosed in U.S. patent application Ser. No. 15/092,037, titled "ASYMMETRIC SWITCHING CAPACITOR REGULATOR," filed on Apr. 6, 2016, by Crossley et al.; and/or U.S. Provisional Patent Application No. 62/324,091, titled "RECONFIGURABLE DICKSON STAR SWITCHED CAPACITOR VOLTAGE REGULATOR," filed on Apr. 18, 2016, by Puggelli et al., each of which is hereby incorporated by reference herein in its entirety.

In embodiments in which a regulator such as regulator 1006 of FIG. 10 includes a reconfigurable SC regulator, a controller can be used to dynamically reconfigure the conversion mode of the reconfigurable SC regulator based on a desired battery charging speed. For example, suppose that a reconfigurable SC regulator is operating at a conversion mode associated with a 2:1 conversion ratio and it becomes desirable to charge a battery at a faster speed. In this case, a controller can cause the reconfigurable SC regulator to change the conversion mode so that the SC regulator operates at a higher conversion mode N:1 (e.g., 3:1 or 4:1). Also, the controller can request that an adapter increase the input voltage of the reconfigurable SC regulator so that the input voltage of the reconfigurable SC regulator is N times greater than the battery voltage ($V_{BAT}$). This allows the voltage regulator system to dynamically vary the charging speed of the battery. Voltage regulator system 1002 shown in FIG. 10 enables backwards compatibility for fast charging, meaning that mobile devices configured to be used with old charging cables that do not support high current can also benefit from fast charging by increasing $V_{BUS}$ 103 instead of $I_{BUS}$ 119.

In some embodiments, a controller, such as controller 1004 of FIG. 10, can reconfigure a reconfigurable SC regulator when the controller detects that the efficiency of the reconfigurable SC regulator at the current conversion mode is low. For example, when the reconfigurable SC regulator efficiency is significantly reduced due, in part, to an increased parasitic voltage drop, the controller can reconfigure the reconfigurable SC regulator to operate at a lower conversion mode. That way, the controller can protect against a severe drop in efficiency of the reconfigurable SC regulator.

Figure 6:
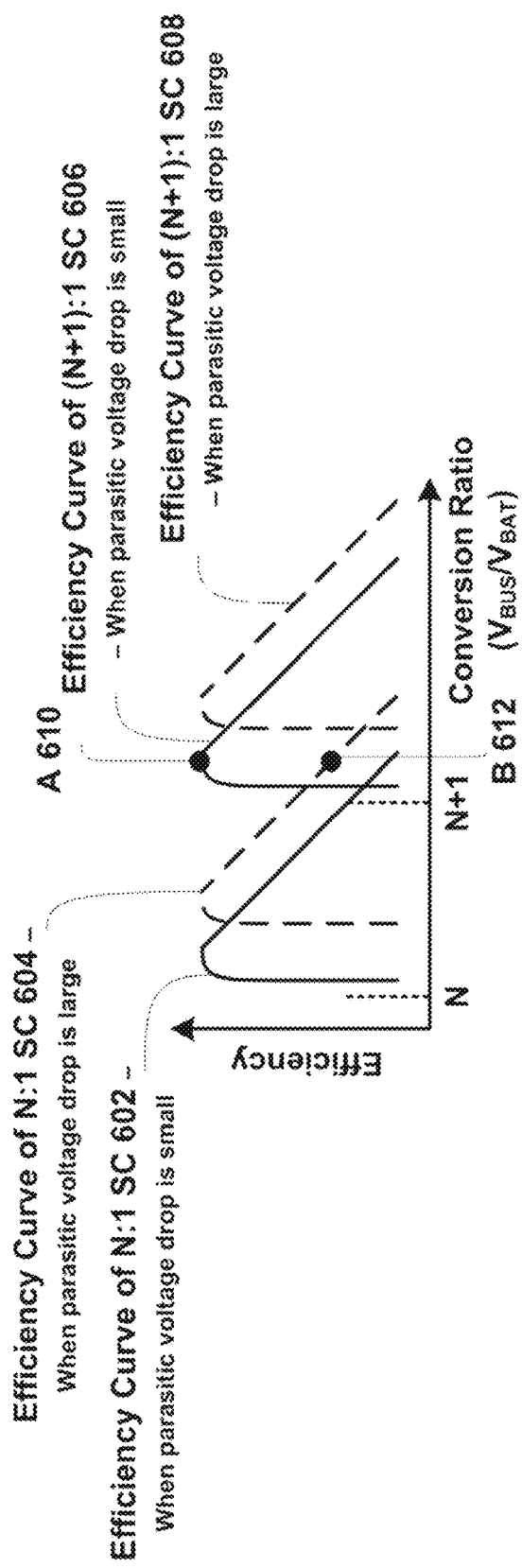
FIG. 6 illustrates an example of a graph showing efficiency curves of a reconfigurable SC regulator at two conversion modes in accordance with some embodiments.

FIG. 6 illustrates an example of graphs showing efficiency curves of a reconfigurable SC regulator at two conversion modes—N:1 and (N+1):1—in accordance with some embodiments. Curves 602, 604 show the efficiency of the reconfigurable SC regulator at a conversion mode of N:1; and curves 606, 608 show the efficiency of the reconfigurable SC regulator at a conversion mode of (N+1):1.

Initially, the reconfigurable SC regulator can operate in the conversion mode of (N+1):1 in which the parasitic voltage drop is small (e.g., the output current is small). In this case, the voltage regulator system including the reconfigurable SC regulator can operate the reconfigurable SC regulator at optimal operating point A 610. When the parasitic voltage drop becomes large (e.g., due to a larger output current), efficiency curve 606 would shift to the right as shown by efficiency curve 608. Due to this increase in the parasitic voltage drop, the efficiency of the reconfigurable SC regulator would drop significantly (off the "cliff" portion of efficiency curve 608).

To address this efficiency reduction, once a controller of the voltage regulation system detects that the parasitic voltage drop has increased, the controller can reconfigure the reconfigurable SC regulator to operate at a conversion mode of N:1, instead of (N+1):1. This way, the reconfigurable SC regulator can be forced to operate on efficiency curve 604, instead falling off the "cliff" on efficiency curve 608. In other words, the voltage regulator system can reconfigure the reconfigurable SC regulator so that the reconfigurable SC regulator operates at an operating point B 612. Since the controller can reconfigure the reconfigurable SC regulator to protect against a severe drop in efficiency, the controller can operate the reconfigurable SC regulator at its optimal operating point A 610.

In some embodiments, once the controller determines the operating point for the reconfigurable SC regulator, the controller can request that an adapter provide $V_{BUS}$ so that the conversion ratio of the reconfigurable SC regulator is matched to the conversion ratio associated with the determined operating point.

In some embodiments, a regulator, such as regulator 1006, can include a hybrid regulator, also referred to as a two-stage regulator. A hybrid regulator includes a series of two voltage regulators: a first stage regulator and a second stage regulator. In some embodiments, the first stage regulator includes an SC regulator and the second stage regulator includes a switching voltage regulator (e.g., buck regulator). Such a hybrid regulator takes advantage of the fact that SC regulators are good at dividing voltages across predetermined fractional values and that switching voltage regulators can be good at regulating a wide range of output voltage in fine steps. This allows the hybrid regulator to achieve a high conversion efficiency even at non-integer conversion ratios.

In some embodiments, such a hybrid regulator can include a hybrid regulator as disclosed in U.S. Pat. No. 9,143,032, titled "APPARATUS, SYSTEMS, AND METHODS FOR PROVIDING A HYBRID POWER REGULATOR," issued on Sep. 22, 2015, to Lion Semiconductor Inc.; and/or U.S. Provisional Patent Application No. 62/324,091, titled "RECONFIGURABLE DICKSON STAR SWITCHED CAPACITOR VOLTAGE REGULATOR," filed on Apr. 18, 2016, by Puggelli et al., collectively the "Hybrid Regulator Documents", each of which is hereby incorporated by reference herein in its entirety.

In some embodiments, a hybrid regulator can support a plurality of conversion modes to support different conversion ratios. For example, a hybrid regulator with (1) a reconfigurable 3:1 SC regulator and (2) a switched-inductor regulator can support five modes of operation: a S3 conversion mode, a H32 hybrid conversion mode, a S2 conversion mode, a H21 hybrid conversion mode, and a S1 conversion mode.

As discussed in the Hybrid Regulator Documents, a hybrid regulator can dither between two or more conversion modes of a reconfigurable SC regulator to provide an "average" output voltage of the two or more conversion modes of a reconfigurable SC regulator. For example, a hybrid regulator, operating in a H32 hybrid conversion mode, can receive an input voltage $V_{IN}$ and dither between a 2:1 switched capacitor conversion mode, also referred to as a S2 conversion mode, and a 3:1 switched capacitor conversion mode, also referred to as a S3 conversion mode, to provide an output voltage that is between $V_{IN}/2$ and $V_{IN}/3$.

In some embodiments, the actual output voltage of a hybrid regulator in a hybrid conversion mode (e.g., H32 hybrid conversion mode) is determined by the proportion of time (e.g., duty cycle) spent in each switched capacitor conversion mode. For example, when the hybrid regulator spends D amount of time in a S2 conversion mode and (1−D) amount of time in a S3 conversion mode, the output voltage would be $(D \times V_{IN}/2 + (1-D) \times V_{IN}/3)$. Therefore, by controlling the value of the duty cycle D, the output voltage of the hybrid regulator can be accurately controlled.

In some embodiments, a hybrid conversion mode can have a conversion factor that is non-integer. For example, the H32 hybrid conversion mode can have a conversion factor of $(2D+3(1-D))$. More generally, the H(N+1)N hybrid conversion mode can have a conversion factor of $(D \times N + (1-D) \times (N+1))$.

In some embodiments, a controller, such as controller 1004 shown in FIG. 10, can configure a hybrid regulator with one of a plurality of conversion modes supported by the hybrid regulator based on the conversion ratio of the hybrid regulator. For example, when the conversion ratio of the hybrid regulator is close to 3:1, the hybrid regulator can operate in the S3 conversion mode. As the conversion ratio decreases (e.g., because the input voltage decreases or the output voltage increases), the controller can configure the hybrid regulator to operate in the H32 conversion mode. As the conversion ratio decreases further to a point where the conversion ratio is close to 2:1, the controller can configure the hybrid regulator to operate in the S2 conversion mode. As this process continues, the hybrid regulator can in some embodiments be configured to operate in the H21 conversion mode, and eventually in the S1 conversion mode. The conversion mode transitions to a "lower" mode as the hybrid regulator transitions from the S_N conversion mode (a N:1 switching capacitor conversion mode) to the S1 conversion mode; and the conversion mode transitions to a "higher" mode as the hybrid regulator transitions from the S1 conversion mode to the S_N conversion mode.

Figure 7:
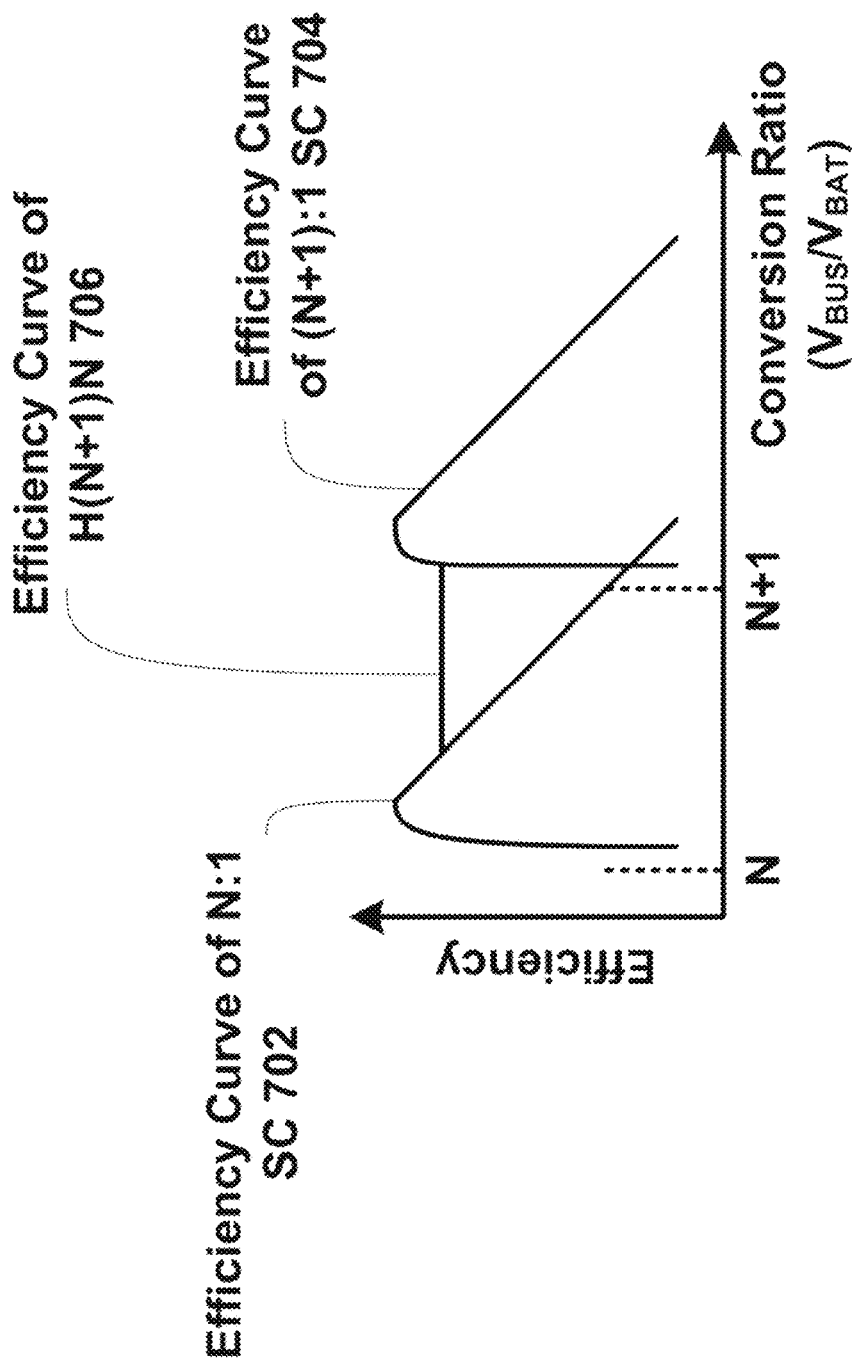
FIG. 7 illustrates an example of a graph showing efficiency curves of a hybrid regulator at three conversion modes in accordance with some embodiments.

In some embodiments, a voltage regulator system, such as voltage regulator 1002 shown in FIG. 10, can improve its efficiency across a large range of conversion ratios by using a hybrid regulator. FIG. 7 illustrates an example of a graph showing efficiency curves of a hybrid regulator at three conversion modes—the switched capacitor N:1 mode, the switched capacitor (N+1):1 mode, and the hybrid H(N+1)N mode—in accordance with some embodiments. A controller in the voltage regulator system can configure a hybrid regulator in the voltage regulator system to operate at a particular conversion mode to improve the voltage regulator system's efficiency across a large range of conversion ratios. As discussed above, a hybrid regulator can dither between two switched capacitor conversion modes. Efficiency curves that can be associated with two such switched capacitor conversion modes are shown by curves 702 and 704. The dithering between the switched capacitor conversion modes in effect replaces the "cliff" in the efficiency curve 704 with a line 706 that connects the efficiency curves 702 and 704. Therefore, the hybrid regulator does not have a risk of a sudden degradation of efficiency and a loss of output regulation even when there is a large fluctuation in the parasitic voltage drop. For example, when the hybrid regulator is in the (N+1):1 switched capacitor conversion mode and is about to lose the output regulation and drop off the "cliff," the controller can configure the hybrid regulator to operate to the H(N+1)N hybrid conversion mode. This allows the voltage regulator system to operate at a high efficiency operating point across a large range of conversion ratios.

Figure 8:
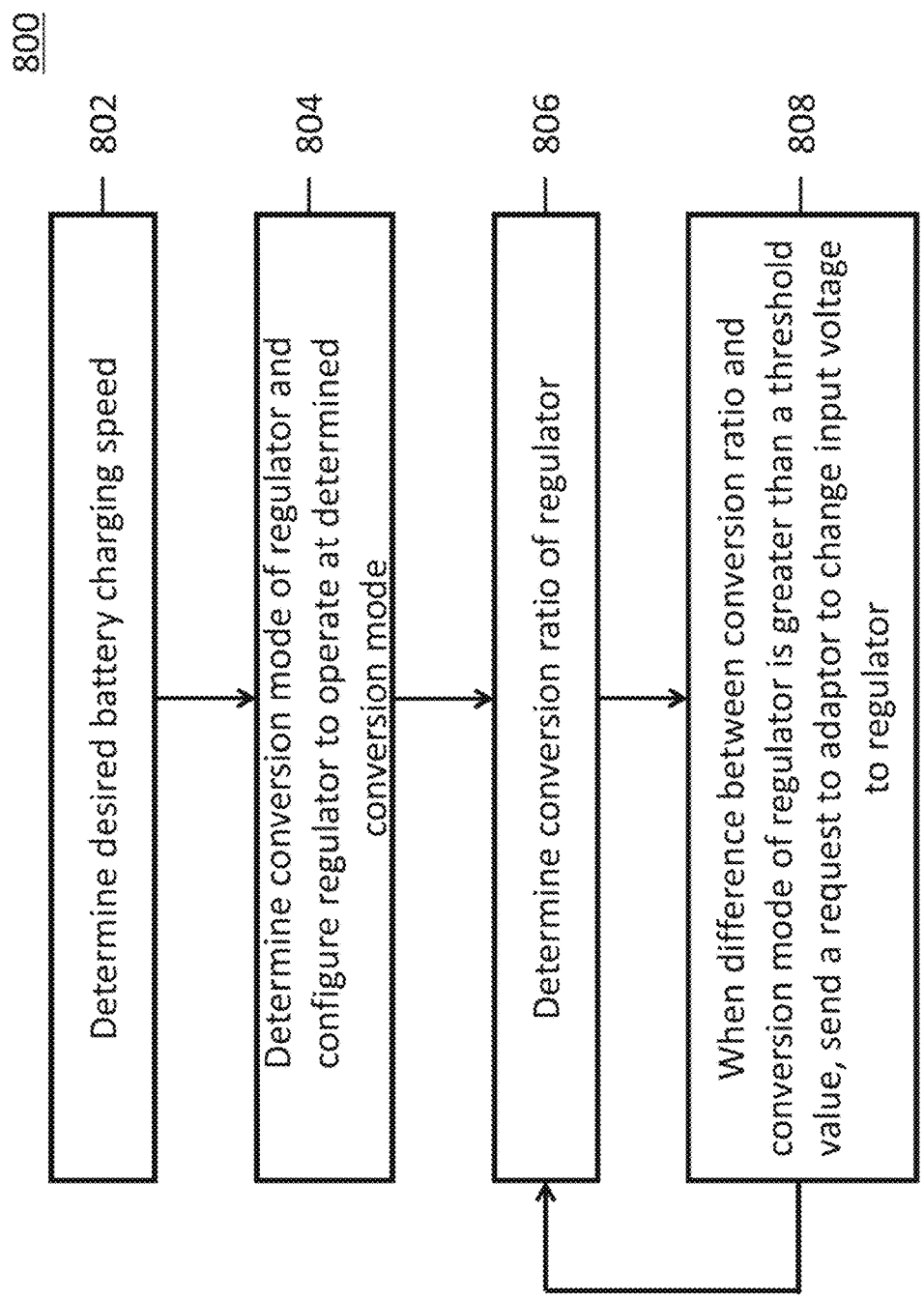
FIG. 8 shows an example of a flow diagram illustrating an example of a process that can be used to operate a voltage regulator system having a reconfigurable SC regulator or a hybrid regulator in accordance with some embodiments.

FIG. 8 shows an example of a flow diagram illustrating an example of a process that can be used to operate a voltage regulator system, such as voltage regulator system 1002 shown in FIG. 10, having a reconfigurable SC regulator or a hybrid regulator in accordance with some embodiments. In block 802, a controller receives an instruction to charge the battery at a particular charging speed. In block 804, the controller is configured to determine the conversion mode of the regulator that could accommodate the particular charging speed, and configure the regulator to operate at that determined conversion mode.

In some embodiments, the controller is configured to determine the initial conversion mode of the regulator using a conversion mode table. The conversion mode table can include a mapping between a target charging speed and a corresponding conversion mode. Therefore, when the controller receives an indication that the target charging speed should be at a first level, the controller can determine the conversion mode associated with that first level using the conversion mode table. In some embodiments, the target charging speed is represented as the target charging current $I_{CHG}$. In such embodiments, the conversion mode table can include a mapping between the target charging current $I_{CHG}$ and the conversion mode.

In some embodiments, the controller is configured to determine the initial conversion mode based on a ratio between (1) the target charging current and (2) the maximum output current of an adapter that provides power to the regulator. For example, when the target charge current $I_{CHG}$ is 5 A and the maximum output current of the adapter ($I_{BUS\_MAX}$) is 3 A, the controller can determine a ratio between the target charge current $I_{CHG}$ and the maximum output current of the adapter, $I_{BUS\_MAX}$, to determine that the target conversion ratio is close to 5/3. Therefore, the controller is configured to set the conversion mode of the regulator to be at the S2 conversion mode or the H21 conversion mode. As another example, when the target charge current $I_{CHG}$ is 8 A and the maximum output current ($I_{BUS\_MAX}$) of an adapter providing power to the regulator is 3 A, the controller can determine a ratio between the target charge current $I_{CHG}$ and the maximum output current of the adapter, $I_{BUS\_MAX}$, to determine that the target conversion ratio is close to 8/3. Therefore, the controller is configured to set the conversion mode of the regulator to be at the S3 conversion mode or the H32 conversion mode.

Once the controller determines the initial conversion mode and configures the regulator to operate in the initial conversion mode, the controller can track the efficiency of the regulator to determine, in substantially real-time, the conversion mode that is most energy-efficient, as discussed in blocks 806-808.

In block 806, the controller is configured to determine a conversion ratio of the regulator (e.g., the present value of $V_{BUS}/V_{BAT}$). In block 808, the controller is configured to compare the determined conversion ratio with the conversion mode of the regulator. If the difference between the conversion ratio and the conversion mode of regulator is greater than a threshold value, then the controller is configured to send a request to the adapter to change the input voltage $V_{BUS}$ to the regulator. In some embodiments, in block 808, the controller is configured to send the request to the adapter when the input voltage $V_{BUS}$ is less than (conversion factor)×$V_{BAT}$. The controller can iterate blocks 806 and 808 to maintain a conversion ratio that is close to the conversion factor associated with the conversion mode in which the regulator operates.

In some embodiments, the iteration of blocks 806 and 808 can be interrupted when the controller receives a newly desired battery charging speed, in which case process 800 will loop back to block 802 (which looping back is not shown in FIG. 8). In some embodiments, the iteration of the blocks 806 and 808 can be interrupted when the controller determines that the efficiency of the regulator is low. In this case, the controller is configured to loop back to block 804 to determine a better conversion mode for the regulator (which looping back is not shown in FIG. 8).

In some embodiments, the efficiency of the regulator can be measured by measuring the input power and output power of the regulator. The input power and the output power can be measured using circuits such as analog to digital converters (ADCs). For example, one or more ADCs can measure the input voltage and the input current to determine the input power, and one or more ADCs can measure the output voltage and output current to determine the output power. In some cases, a single ADC can measure both the input power and the output power.

Figure 9:
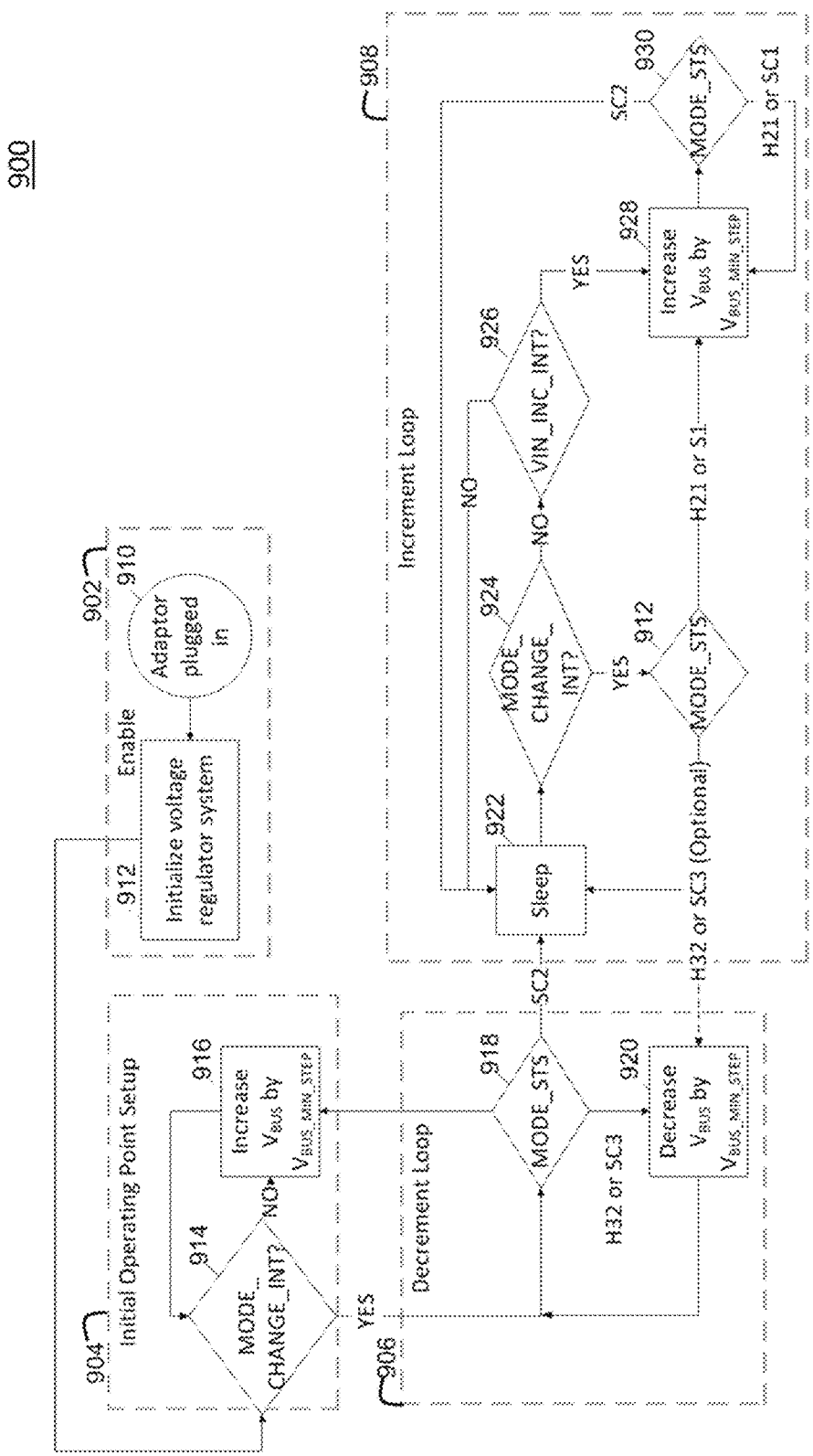
FIG. 9 shows an example of a detailed flow diagram illustrating an example of a process that can be used to operate a controller in the voltage regulator system in accordance with some embodiments.

FIG. 9 shows an example of a detailed flow diagram illustrating an example 900 of a process that can be used to operate a controller in the voltage regulator system, such as voltage regulatory system 1002 shown in FIG. 10, in accordance with some embodiments.

At a high level, in process 900, the controller operates in four phases: an enable phase 902, an initial-operating-point-setup phase 904, a decrement-loop phase 906, and an increment-loop phase 908.

During enable phase 902, the controller is configured to enable the regulator in the voltage regulator system.

During initial-operating-point-setup phase 904, the controller is configured to determine the initial conversion mode for the regulator. For example, if the regulator in the voltage regulator system is a hybrid regulator, the hybrid regulator can be configured to be in the H21 hybrid conversion mode; if the regulator in the voltage regulator system is a reconfigurable SC regulator, the reconfigurable SC regulator can be configured to be in the S1 conversion mode. Subsequently, the controller sends one or more requests to an adapter that provides power to the voltage regulator system to increase the input voltage ($V_{BUS}$) to the regulator so that the input voltage $V_{BUS}$ is substantially close to (conversion factor)×(output voltage of the regulator ($V_{BAT}$)).

During decrement-loop-phase 906 and increment-loop phase 908, once the regulator is in the target conversion mode and the input voltage $V_{BUS}$ is substantially close to (conversion factor)×(output voltage of the regulator ($V_{BAT}$)), the voltage regulator system is configured to adjust the adapter output (the input voltage $V_{BUS}$) so that the regulator can stay in that conversion mode. For example, if the regulator's conversion ratio is higher than the conversion factor associated with the conversion mode (e.g., meaning $V_{BUS}/V_{BAT}$ is larger than the conversion factor of the conversion mode or $V_{SCDROP}$ is larger than expected), the controller is configured to request that the adapter decrease its output (the input voltage $V_{BUS}$) so that the conversion ratio of the regulator returns to the target conversion factor of the conversion mode. Also, as another example, if the regulator's conversion ratio is lower than the conversion factor associated with the conversion mode (e.g., meaning $V_{BUS}/V_{BAT}$ is smaller than the conversion factor of the conversion mode or $V_{SCDROP}$ is smaller than expected), the controller is configured to request that the adapter increase its output (the input voltage $V_{BUS}$) so that the conversion ratio of the regulator returns to the target conversion factor of the conversion mode.

FIG. 9 illustrates the detailed operation of the four phases in accordance with some embodiments. This figure illustrates an embodiment in which a regulator reaches maximum efficiency at the S2 conversion mode (e.g., at the conversion factor of 2). Therefore, a controller is configured to adjust an adapter output voltage ($V_{BUS}$) so that the regulator stays at the S2 conversion mode as long as possible across the charge cycle.

During enable phase 902, in block 910, a mobile device is coupled to the adapter. Once the mobile device is coupled to the adapter, the controller is configured to perform an initialization routine at block 912.

In some embodiments, the initialization routine includes identifying the characteristics of the adapter. Identifying the characteristics of the adapter can include, for example, identifying whether the adapter is capable of adjusting its output voltage ($V_{BUS}$) upon receiving a request from the controller. Identifying the characteristics of the adapter can also include, for example, confirming that the adapter is compliant with a particular standard (e.g., universal serial bus, or USB).

In some embodiments, the initialization routine can also include requesting that the adapter provide a particular default value as an output voltage ($V_{BUS}$). For example, if the adapter is USB-compliant, the controller can request that the adapter provide 5 VDC as the default output value.

In some embodiments, the initialization routine can also include setting a limit on the input current of the regulator so that the regulator does not attempt to draw more current than what the adapter can provide.

In some embodiments, the initialization routine can also include confirming that the regulator is in the right conversion mode for the desired conversion ratio.

In some embodiments, the adapter can be configured to provide an output voltage ($V_{BUS}$) of 5 VDC as the default value. Because, the battery voltage ($V_{BAT}$) for a battery (e.g., a single-stack Li-Ion battery) is often between 3V and 4.5V, the conversion ratio ($V_{BUS}/V_{BAT}$) of the regulator would thus be generally between 1 and 2 in the initial mode. Therefore, in the initial mode, if the regulator is a hybrid regulator, the controller can be configured to set the conversion mode of the regulator as H21 hybrid conversion mode. If the regulator is a reconfigurable SC regulator that does not accommodate a hybrid conversion mode, the controller can be configured to set the conversion mode of the regulator as a S1 conversion mode.

Once the controller completes enable phase 902, the controller moves to initial-operating-point-setup phase 904. In this phase, the controller is configured to set the initial operating point for the regulator.

In block 914, the controller is configured to check whether there is a mode change by checking whether an interrupt signal, named MODE_CHANGE_INT, has been asserted. When MODE_CHANGE_INT is not asserted, the controller knows that the regulator is in the initial operating mode (e.g., the H21 conversion mode for a hybrid regulator, or the S1 conversion mode for a reconfigurable SC regulator).

When MODE_CHANGE_INT is not asserted, the controller moves to block 916. In block 916, since the controller is designed to increase the adapter output voltage ($V_{BUS}$) for faster battery charging, the controller is configured to request that the adapter increase its output voltage. In some embodiments, the controller can be configured to request that the adapter increase its output voltage by a particular voltage step (e.g., $V_{MIN\_STEP}$).

In response to receiving the request from the controller, the adapter can increase its output voltage ($V_{BUS}$). When the adapter increases its output voltage, the output voltage may have some transient ripples or glitches. Therefore, after sending the request to the adapter to increase the output voltage, the controller can wait a predetermined period of time (so that the ripples or glitches disappear) before moving onto the next block. In some embodiments, the controller can repeat blocks 914 and 916 until there is a mode change (e.g., until the interrupt signal MODE_CHANGE_INT is asserted).

When MODE_CHANGE_INT is asserted, the controller is configured to update the conversion mode of the regulator to the conversion mode that is one step higher than the prior conversion mode. For example, if the regulator is a hybrid regulator, the controller can update the conversion mode of the regulator from the H21 conversion mode to the S2 conversion mode; if the regulator is a reconfigurable SC regulator, the controller can update the conversion mode of the regulator from the S1 conversion mode to the S2 conversion mode.

In block 918 of decrement-loop phase 906, the controller is configured to determine the current conversion mode of the regulator. For example, the controller can check the signal MODE_STS to determine the current conversion mode of the regulator.

If the regulator is not in the S2 conversion mode (e.g., H32 or SC3) for some reason, in block 920, the controller is configured to decrease the adapter output voltage by a voltage step (e.g., $V_{BUS\_MIN\_STEP}$). The controller is configured to decrease the adapter output voltage until the regulator operates in the S2 conversion mode by repeating blocks 918 and 920.

If the regulator is in the S2 conversion mode (SC2), which is what is expected, the regulator can operate as illustrated in FIGS. 4A-4B, where the regulator increases the adapter output voltage by a voltage step (e.g., $V_{BUS\_MIN\_STEP}$) as the battery is charged. The controller then moves to the increment-loop phase 908.

In block 922 of the increment-loop phase 908, the controller is configured to enter into a sleep mode. This means that the controller does not request that the adapter modify its output voltage until the controller receives an interrupt signal or the controller has been in the sleep mode for a predetermined period of time.

In block 924, when the controller wakes up from the sleep mode, the controller is configured to determine whether the controller has received an interrupt signal (e.g., the interrupt signal MODE_CHANGE_INT is asserted). If the controller has not received the interrupt signal, in block 926, the controller is configured to determine whether the adapter output voltage should be increased. In some embodiments, the controller is configured to determine whether the adapter output voltage ($V_{BUS}$) should be increased by analyzing another interrupt signal called $V_{INC\_INC\_INT}$, which can be generated by the controller. In other embodiments, the controller is configured to determine whether the adapter output voltage ($V_{BUS}$) should be increased by comparing the adapter output voltage and (conversion factor)×(battery voltage).

When the controller determines that the adapter output voltage does not need to increase, then the controller returns to the sleep mode in block 922. When the controller determines that the adapter output voltage should increase, then in block 928, the controller sends a request to the adapter to increase the output voltage ($V_{BUS}$) by a voltage step (e.g., $V_{BUS\_MIN\_STEP}$).

In block 930, the controller is configured to determine the current conversion mode of the regulator by, for example, analyzing the status signal MODE_STS. If the regulator 1006 is in the S2 conversion mode (SC2), the controller returns to the sleep mode in block 922. If the regulator is in a lower mode such as the H21 conversion mode (H21) or the S1 conversion mode (SC1), the controller is configured to request that the adapter increase the output voltage by $V_{BUS\_MIN\_STEP}$ until the regulator operates in the S2 conversion mode.

Going back to block 924, if the controller has received the interrupt signal indicating that the conversion mode should change, the controller is configured to determine the current conversion mode by, for example, analyzing the status signal MODE_STS at block 912.

If the current conversion mode is lower than the S2 conversion mode, such as the H21 conversion mode or the S1 conversion mode, the controller performs block 928. If the current conversion mode is higher than the S2 conversion mode, such as the H32 conversion mode or the SC3 conversion mode, the controller may perform one of two options. The first option is for the voltage regulator system to stay in the current mode by moving to block 922 and wait for the battery voltage to increase to a point where the voltage regulator system operates in the S2 conversion mode. The second option is to go to block 920 of the decrement-loop phase 906 and decrease the adapter output voltage by $V_{BUS\_MIN\_STEP}$ so that the regulator can enter into the S2 conversion mode more quickly.

While FIG. 9 illustrates an embodiment in which the regulator reaches the maximum efficiency at the S2 conversion mode (SC2) (e.g., at the conversion factor of 2), this operation can be used in cases where the regulator reaches the maximum efficiency at S_N conversion mode. In that case, S1, H21, H32, S3 can be changed to S(N−1), H_N(N−1), H_(N+1)N, S_(N+1) conversion modes, respectively. In this case, the controller is configured to adjust the adapter output voltage ($V_{BUS}$) so that the regulator stays at the S_N conversion mode as long as possible across the charge cycle.

In some embodiments, when the regulator is a hybrid regulator, the controller can be configured to adjust the adapter output voltage so that the regulator stays in the switched capacitor conversion mode (e.g., S2, S3, . . . S_N) as long as possible, where N is an integer number larger than 1. Switched capacitor conversion modes may be favorable to hybrid conversion modes because the efficiency of the regulator at switched capacitor conversion modes may be higher than the efficiency of the regulator at hybrid conversion modes.

Figure 11:
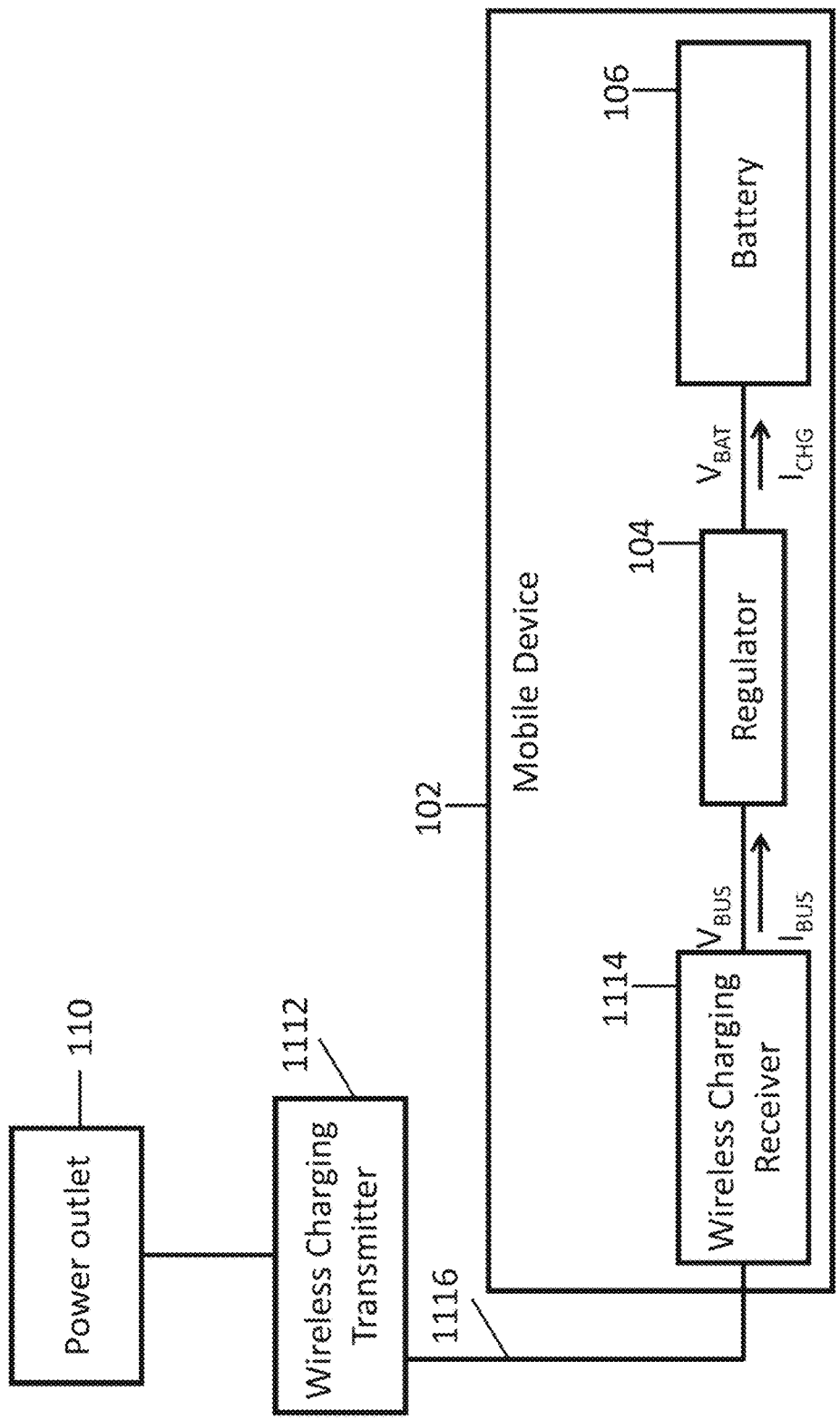
FIG. 11 depicts an example of a block diagram of a typical wireless charging system for a mobile device as known in the prior art.

Turning to FIG. 11, an example of a typical wireless charger system for charging a mobile device is shown. Like what is shown in, and described in connection with, FIG. 1, the system of FIG. 11 includes a mobile device 102, a regulator 104, and a power outlet 110. However, unlike FIG. 1, the system of FIG. 11 includes a wireless charging transmitter 1112 and a wireless charging receiver 1114. During operation, wireless charging transmitter 1112 wirelessly transmits power to wireless charging receiver 1114. This wireless transmission can be performed in any suitable manner, such as by using an inductive coupling between the transmitter and the receiver. The wireless transmission is illustrated in FIG. 11 by line 1116.

Figure 12:
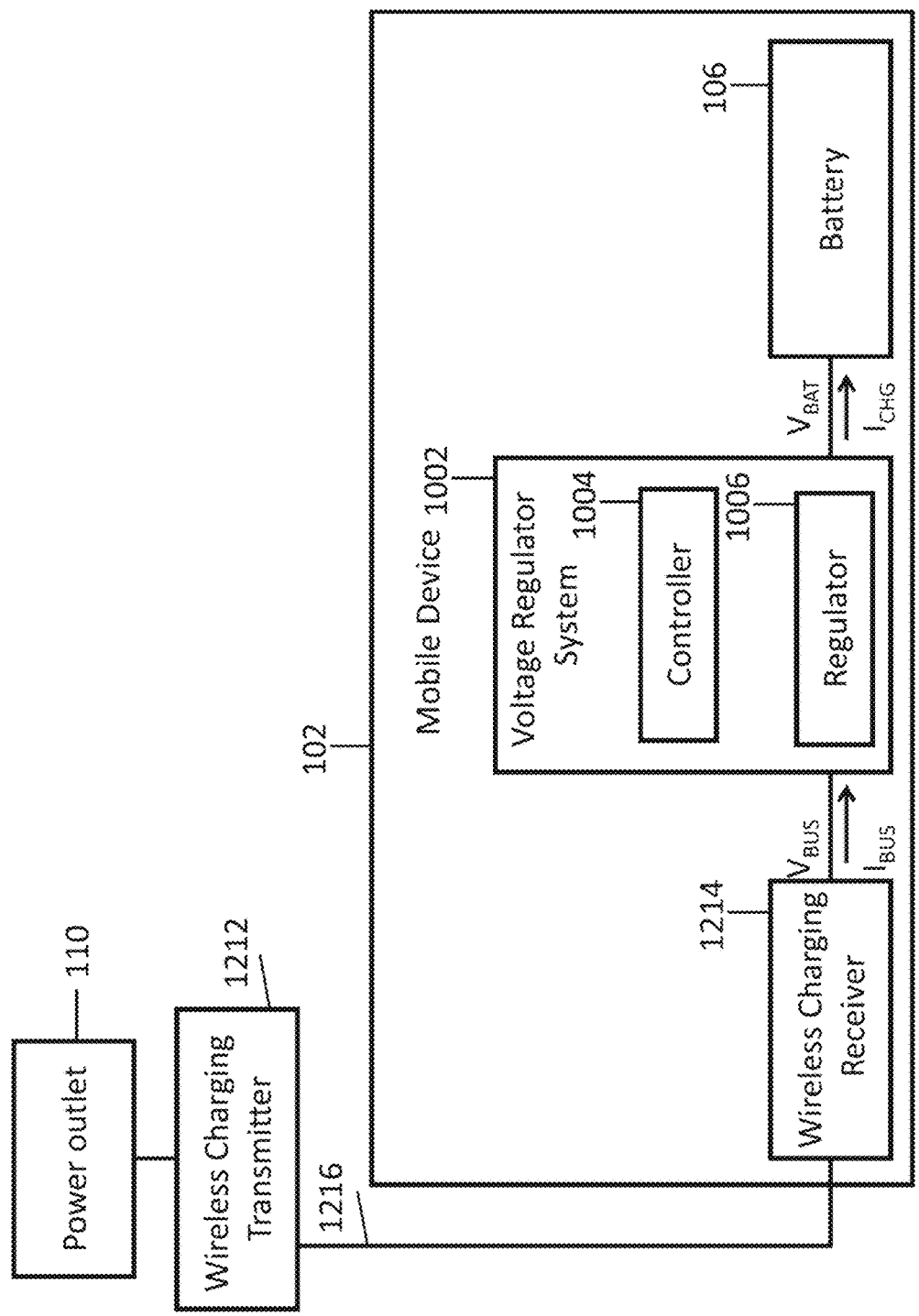
FIG. 12 depicts an example of a block diagram of a wireless charging system for a mobile device in accordance with some embodiments.

FIG. 12 illustrates an example of a wireless charger system for charging a mobile device in accordance with some embodiments. Like what is shown in, and described in connection with FIG. 10, the system of FIG. 11 includes a power outlet 110, a voltage regulator system 1002, and a battery 106. Power outlet 110, voltage regulator system 1002, and battery 106 can be implemented, and can behave, similarly to what is described above. Unlike what is in FIG. 10, the wireless charging system shown in FIG. 12 does not use an adapter 108, but instead uses a wireless charging transmitter 1212 and a wireless charging receiver 1214.

In some embodiment, wireless charging transmitter 1212 can include an inductor coil that is energized by the transmitter with an AC voltage (having a given amplitude and a given frequency) so as to produce a magnetic field (which is represented in FIG. 12 by line 1216). In such embodiments, wireless charging receiver 1214 can include an inductor coil that is placed within this magnetic field, resulting in power being received as a current that is induced in the receiver's conductor coil by the magnetic field and an AC voltage that is produced across the receiver's conductor coil. To produce a $V_{BUS}$ output as a DC voltage, the receiver can include a rectifier that converts the AC voltage on the receiver's inductor coil to a DC voltage.

Like done by adapter 108 as described above, in some embodiments, it may be desirable to adjust $V_{BUS}$ in order to match a desired conversion ratio of regulator 1006 (e.g., when regulator 1006 is a SC regulator). In some embodiments, in order to do so, the amplitude and the frequency of the AC voltage used to energize the inductor coil of the wireless charging transmitter can be controlled so that the amplitude and the frequency of the AC voltage on the inductor coil of the wireless charging receiver have given values such that once the receiver's AC voltage is rectified, the resulting DC voltage is a desired voltage $V_{BUS}$.

In order to control the amplitude and the frequency of the transmitter's AC voltage, controller 1004 can send one or more wireless control signals to the wireless charging transmitter. These wireless control signals can be transmitted using any suitable mechanism. For example, these control signals can be transmitted by the wireless charging receiver to the wireless charging transmitter. More particularly, for example, the wireless charging receiver can transmit control signals to the wireless charging transmitter using backscatter modulation or any other suitable wireless signal. Such backscatter modulation can operate by the wireless charging receiver modulating the current drawn through the inductor it uses to receive a charging signal from the wireless charging transmitter, which modulates the current in the inductor used by the wireless charging transmitter to transmit the charging signal, and by the wireless charging transmitter detecting, demodulating, and decoding the current modulation in its inductor to produce a received control signal. Any suitable information signals (i.e., signals that are not solely charging signals) can be transmitted from the receiver to the transmitter in this manner. In some embodiments, the wireless charging transmitter can send one or more information signals to the wireless charging receiver in similar manner by modulating the currents in the transmitter's inductor so that the current in the receiver's inductor is modulated, which can then be detected, demodulated, and decoded to provide a received information signal at the receiver.

Figure 13:
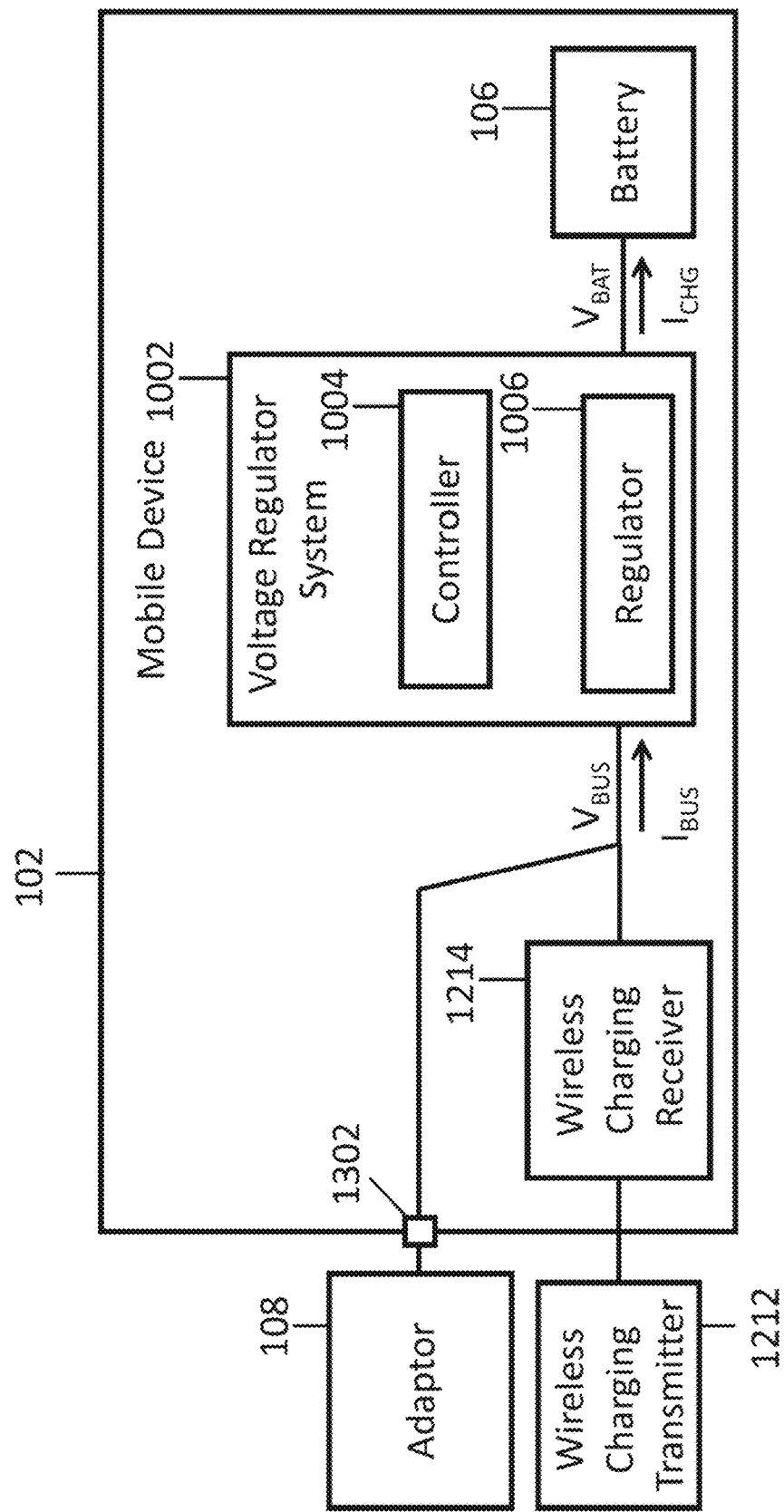
FIG. 13 depicts an example of a block diagram of a wireless charging system for a mobile device that can also be connected to a wired charging adapter in accordance with some embodiments.

In some embodiments, a wireless charging system can be capable of both wired and wireless charging as shown in the example of FIG. 13. As illustrated, a mobile device can have a voltage regulator system 1002 that is coupled to both an adapter port 1302 and a wireless charging receiver 1214. Voltage regulator system 1002 can be coupled to both adapter port 1302 and wireless charging receiver 1214 in any suitable manner, such as by one or more switches, by a multiplexer, etc. In order to charge the mobile device, a user can connect adapter port 1302 to an adapter 108, which can receive power from a power outlet, not shown. Alternatively, the user can place the mobile device so that an inductor in its wireless charging receiver is in a magnetic field produced by a wireless charging transmitter 1212, which can receive power from a power outlet, not shown.

Depending on whether the mobile device of FIG. 13 is connected to adaptor 108 or is placed in the magnetic field of transmitter 1212, the voltage regulator system (e.g., using controller 1004) can set the input to regulator 1006 (which receives voltage $V_{BUS}$) to be connected to the output of the adaptor or the output of the wireless charging receiver using one or more switches. The controller can then control $V_{BUS}$ as output by the adapter or the wireless charging receiver as described above.

Compared to using two separate voltage regulator systems for wired and wireless charging, using a singled voltage regulator system that can be connected to either reduces the total system Bill of Materials (BOM) and cost. This is possible even when an SC regulator used for wired charging needs to operate at different N:M SC ratios than an SC regulator used for wireless charging. For example, a wired charging system can be optimized for a 3:1 SC regulator ($V_{BUS}$ is close to $3 \times V_{BAT}$) while the wireless charging system may be optimized for a 4:1 SC regulator ($V_{BUS}$ is close to $4 \times V_{BAT}$). Instead of using a separate 3:1 SC regulator and a separate 4:1 SC regulator, a single reconfigurable SC regulator that supports both 3:1 and 4:1 can be used.

In some embodiments, a voltage regulator system, such as voltage regulator system 1002 shown in FIG. 10, can be implemented as a single chip. The single chip can include a single die that includes both a controller and a regulator as disclosed herein. The single chip can include two or more dies where one die includes a controller and another die includes a regulator. In other embodiments, a voltage regulator system can include two or more chips where one chip includes a controller and another chip includes a regulator.

In some embodiments, a controller such as controller 1004 shown in FIG. 10, can be implemented as a software application running on a hardware processor. The software application can be stored in memory. The memory can be a non-transitory computer readable medium, flash memory, a magnetic disk drive, an optical drive, a programmable read-only memory (PROM), a read-only memory (ROM), or any other memory or combination of memories. The software can run on a hardware processor capable of executing computer instructions or computer code. The hardware processor can be implemented in any suitable hardware such as a microprocessor, a micro-controller, an application specific integrated circuit (ASIC), programmable logic array (PLA), field programmable gate array (FPGA), or any other suitable circuit. In some embodiment, the controller can be implemented in hardware using an application specific integrated circuit (ASIC), programmable logic array (PLA), field programmable gate array (FPGA), or any other suitable circuit. In some embodiments, the controller can be synthesized using hardware programming languages including Verilog, VHDL, and Bluespec.

As such, those skilled in the art will appreciate that the conception, upon which this disclosure is based, may readily be utilized as a basis for the designing of other structures, apparatuses, systems, and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A system for charging a battery, comprising:
a regulator having an output coupled to the battery and having an input;
a wireless charging receiver having an output coupled to the input of the regulator and having an input that receives a power signal from a wireless charging transmitter;
a controller having a first input coupled to the input of the regulator, having a second input coupled to the output of the regulator, and having a first output coupled to the wireless charging transmitter, wherein the controller is configured to send, using the first output of the controller, a control signal that is determined based upon a ratio of a first measured voltage at the first input and a second measured voltage at the second input to the wireless charging transmitter that causes the wireless charging transmitter to change the power signal provided to the wireless charging receiver.

2. The system of claim 1, wherein the control signal causes the wireless charging transmitter to change at least one of an amplitude and a frequency of an AC voltage on an inductor of the wireless charging transmitter that is inductively coupled to an inductor of the wireless charging receiver.

3. The system of claim 1, wherein the control signal causes a voltage output by the output of the wireless charging receiver to change.

4. The system of claim 1, wherein the control signal causes the voltage output by the output of the wireless charging receiver to increase by a step amount.

5. The system of claim 1, wherein the control signal causes the voltage output by the output of the wireless charging receiver to decrease by a step amount.

6. The system of claim 1, wherein the regulator includes a switched capacitor regulator, and wherein the control signal causes the voltage output by the output of the wireless charging receiver to change to a voltage that is an integer multiple of a voltage output by the output of the regulator.

7. The system of claim 1, wherein the controller sends the control signal based upon the ratio being greater than a value.

8. The system of claim 7, wherein the value is a threshold about more than a conversion factor of the regulator.

9. The system of claim 1, wherein the controller has a second output coupled to the regulator that causes the regulator to switch modes.

10. The system of claim 9, wherein the controller causes the regulator to change from a first conversion mode of the regulator to a second conversion mode of the regulator.

11. The system of claim 10, wherein the first conversion mode of the regulator has a different conversion factor that the second conversion mode of the regulator.

12. The system of claim 1, wherein the first output of the controller is wirelessly coupled to the wireless charging transmitter.

13. The system of claim 1, wherein the first output of the controller is wirelessly coupled to the wireless charging transmitter using the wireless charging receiver.

14. The system of claim 1, wherein the input of the regulator is also coupled to an adapter port configured to be coupled to a wired charging adapter.

15. The system of claim 14, wherein the controller determines whether a wired charging adapter is coupled to the adapter port, and when the controller determines that a wired charging adapter is coupled to the adapter port, the controller controls an output voltage provided by the adapter.

16. The system of claim 14, wherein the controller controls the output voltage provided by the adapter to be an integer multiple of a voltage provided at the output of the regulator.

17. The system of claim 14, wherein the input of the regulator is coupled to the wireless charging receiver by a switch.

18. The system of claim 14, wherein the input of the regulator is coupled to the adapter port by a switch.

\* \* \* \* \*